US012793592B2

(12) United States Patent
Kim et al.

(10) Patent No.: US 12,793,592 B2
(45) Date of Patent: Nov. 10, 2026

(54) PORTABLE DISPLAY DEVICE AND ELECTRONIC DEVICE INCLUDING THE SAME

(71) Applicant: Samsung Display Co., LTD., Yongin-si (KR)

(72) Inventors: Jin Pil Kim, Yongin-si (KR); Won Bok Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/948,321

(22) Filed: Nov. 14, 2024

(65) Prior Publication Data

US 2025/0342785 A1 Nov. 6, 2025

(30) Foreign Application Priority Data

May 3, 2024 (KR) ........................ 10-2024-0059015

(51) Int. Cl.
*G09G 3/20* (2006.01)
*G06F 3/041* (2006.01)
(Continued)

(52) U.S. Cl.
CPC ....... *G09G 3/035* (2020.08); *G06F 3/041662* (2019.05); *G09G 3/2007* (2013.01); (Continued)

(58) Field of Classification Search
CPC ................. G09G 3/035; G09G 3/2007; G09G 2320/0233; G09G 2320/0613; (Continued)

(56) References Cited

U.S. PATENT DOCUMENTS

2009/0167957 A1* 7/2009 Joo ........................... G06T 5/94 348/E5.119
2020/0226990 A1* 7/2020 Jun .......................... G09G 5/14
(Continued)

FOREIGN PATENT DOCUMENTS

KR 20200008922 A 1/2020
KR 102214439 B1 2/2021
(Continued)

*Primary Examiner* — Temesghen Ghebretinsae
*Assistant Examiner* — Ivelisse Martinez Quiles
(74) *Attorney, Agent, or Firm* — Womble Bond Dickinson (US) LLP

(57) ABSTRACT

According to one or more embodiments of the disclosure, a portable display device includes a display panel including an image display area having flat display areas and at least one folding area, a touch sensor on a front surface of the display panel for sensing a user's touch, a touch-driving circuit for detecting a touch position and a touch movement position for a touch-sensing area of the touch sensor, and for generating at least one touch coordinate data, and a display-driving circuit for analyzing image data to confirm characteristics including brightness characteristics, moving image characteristics, and/or still image characteristics of a displayed image, for dividing the image display area into first to k-th display areas according to the confirmed characteristics of the displayed image, and for controlling an image display operation of the image display area by modulating luminance values of image data displayed in at least one of the first to k-th display areas.

20 Claims, 16 Drawing Sheets

(51) Int. Cl.
*G06F 3/044* (2006.01)
*G09G 3/00* (2006.01)

(52) U.S. Cl.
CPC ..... *G06F 3/044* (2013.01); *G09G 2320/0233* (2013.01); *G09G 2320/0613* (2013.01); *G09G 2320/0686* (2013.01); *G09G 2330/023* (2013.01); *G09G 2354/00* (2013.01)

(58) Field of Classification Search
CPC ..... G09G 2320/0686; G09G 2330/023; G09G 2354/00; G09G 3/20; G09G 5/10; G09G 2330/021; G09G 3/3225; G09G 3/006; G09G 2360/16; G06F 1/1652; G06F 3/041662; G06F 3/044; G06F 1/3265; G06F 3/147; G06F 3/0416
See application file for complete search history.

(56) References Cited

U.S. PATENT DOCUMENTS

| | | | | |
|---|---|---|---|---|
| 2020/0326800 | A1* | 10/2020 | Son | G06F 3/04166 |
| 2022/0068216 | A1* | 3/2022 | Yoon | G09G 3/3275 |
| 2022/0139330 | A1* | 5/2022 | Kwon | G06F 3/1431<br>345/204 |
| 2022/0238076 | A1* | 7/2022 | Bae | G09G 3/03 |

FOREIGN PATENT DOCUMENTS

| | | | |
|---|---|---|---|
| KR | 20220013977 | A | 2/2022 |
| KR | 20230079617 | A | 6/2023 |

* cited by examiner

PORTABLE DISPLAY DEVICE AND ELECTRONIC DEVICE INCLUDING THE SAME

CROSS-REFERENCE TO RELATED APPLICATION

The present application claims priority to, and the benefit of, Korean Patent Application No. 10-2024-0059015, filed on May 3, 2024, in the Korean Intellectual Property Office, the entire disclosure of which is incorporated herein by reference.

BACKGROUND

1. Field

The present disclosure relates to a portable display device.

2. Description of the Related Art

The importance of display devices has increased with the development of multimedia. Accordingly, various types of display devices, such as organic light-emitting displays (OLEDs) and liquid crystal displays (LCDs) have been used.

Recently, when a user uses a display device, a method of providing mobility has been an important issue. For example, recently, various portable display devices having performance comparable to that of desktop computers, as well as mobile phones, have been sold.

Due to a reduction in size and weight of the portable display devices, users have performed various functions, such as a function of viewing an image and a function of running an office program while moving, in addition to basic data transmission and reception functions. Accordingly, the users should be able to more conveniently and accurately control the portable display devices.

In a case of the portable display devices, methods for reducing power consumption to increase a use period of a battery while reducing a weight and a size of the battery have been demanded. For example, more efforts to reduce power consumption in an image display period in which power consumption is greater than in a standby mode have been demanded.

SUMMARY

Aspects of the present disclosure provide a portable display device capable of reducing power consumption for each image display area according to characteristics of a displayed image in an image display period in which great power is consumed.

Aspects of the present disclosure also provide a portable display device capable of dividing image display areas in real time so as to correspond to characteristics of a displayed image, and capable of modulating and outputting a maximum luminance range of an image for each image display area.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to one or more embodiments of the disclosure, a portable display device includes a display panel including an image display area having flat display areas and at least one folding area, a touch sensor on a front surface of the display panel for sensing a user's touch, a touch-driving circuit for detecting a touch position and a touch movement position for a touch-sensing area of the touch sensor, and for generating at least one touch coordinate data, and a display-driving circuit for analyzing image data to confirm characteristics including brightness characteristics, moving image characteristics, and/or still image characteristics of a displayed image, for dividing the image display area into first to k-th display areas according to the confirmed characteristics of the displayed image, and for controlling an image display operation of the image display area by modulating luminance values of image data displayed in at least one of the first to k-th display areas.

The display-driving circuit may be configured to divide an area where pixels, which have grayscale values that are greater than a first reference grayscale value of image data sorted in units of at least one frame, are located as the first display area, and to divide an area where pixels, which have grayscale values that are less than the first reference grayscale value of the image data, are located as the k-th display area.

The display-driving circuit may be configured to divide an area where pixels, which have grayscale values that are greater than a first reference grayscale value of image data sorted in units of at least one frame, are located as the first display area, to divide an area where pixels, which have grayscale values that are less than a second reference grayscale value of the image data, are located as the k-th display area, and to divide an area where pixels, which have the first reference grayscale value or the second reference grayscale value of the image data, are located as an image non-modulated area.

The display-driving circuit may be configured to compare image data sorted in units of at least one frame with image data for previous frames to divide an area where pixels, which have grayscale values changing in units of frames, are located as a moving image display area as the first display area, and to compare the image data sorted in units of the at least one frame with the image data for the previous frames to divide an area where pixels, which have grayscale values identically maintained in units of the frames, are located as a still image display area as the k-th display area.

The display-driving circuit may be configured to divide the first display area into a first central area including a central portion of the first display area, and a first peripheral area including a periphery of the first central area, and to divide the k-th display area into a second central area including a central portion of the k-th display area, and a second peripheral area including a periphery of the second central area.

The first central area may include about 60% to about 90% of pixels in the first display area, wherein the first peripheral area includes about 10% to about 40% of the pixels in the first display area.

The second central area may include about 60% to about 90% of pixels in the k-th display area, wherein the second peripheral area includes about 10% to about 40% of the pixels in the k-th display area.

The display-driving circuit may be configured to modulate grayscale values or luminance values of the image data in units of at least one frame to respectively correspond to the first central area, the first peripheral area, the second central area, and the second peripheral area, to convert image data into analog data voltages, and to supply the analog data voltages to data lines to which pixels are connected.

The display-driving circuit may include a data sorter for analyzing characteristics including the brightness characteristics, the moving image characteristics, or the still image characteristics of the displayed image, and for dividing the image display area into the first to k-th display areas, a data modulator for receiving image data sorted from the data sorter, and pixel coordinate information on the first to k-th display areas divided in units of at least one frame, and for generating modulated image data in units of at least one frame by modulating or maintaining luminance values of image data for each pixel respectively corresponding to the first to k-th display areas according to a percentage according to a modulation luminance range, and a DA modulation output for converting image data for each pixel of the modulated image data into data voltages, and for supplying the data voltages into data lines to which respective ones of the pixels are connected.

The data sorter may be configured to divide the first display area into the first central area and the first peripheral area, to divide the k-th display area into the second central area and the second peripheral area, and to generate the pixel coordinate information on the first central area, the first peripheral area, the second central area, and the second peripheral area.

The data modulator may be configured to generate modulated image data for each pixel corresponding to the first central area by maintaining luminance values of image data for each pixel corresponding to the first central area according to a percentage according to a first modulation luminance range, wherein a maximum luminance value is maintained at about 100% compared to a minimum luminance value in the first modulation luminance range.

The data modulator may be configured to generate modulated image data for each pixel corresponding to the first peripheral area by modulating luminance values of image data for each pixel corresponding to the first peripheral area according to a percentage according to a second modulation luminance range, wherein a maximum luminance value in the second modulation luminance range is about 99% to about 90% of the maximum luminance value of the first modulation luminance range.

The data modulator may be configured to generate modulated image data for each pixel corresponding to the second central area by modulating luminance values of image data for each pixel corresponding to the second central area according to a percentage according to a third modulation luminance range, wherein a maximum luminance value in the third modulation luminance range is about 89% to about 80% of the maximum luminance value of the first modulation luminance range, or wherein the third modulation luminance range is substantially equal to the second modulation luminance range.

The data modulator may be configured to generate modulated image data for each pixel corresponding to the second peripheral area by modulating luminance values of image data for each pixel corresponding to the second peripheral area according to a percentage according to a fourth modulation luminance range, wherein a maximum luminance value in the fourth modulation luminance range is about 79% to about 70% of the maximum luminance value of the first modulation luminance range.

According to one or more embodiments of the disclosure, a portable display device includes a display panel including an image display area divided into flat display areas and at least one folding area, a touch sensor on a front surface of the display panel for sensing a user's touch, a touch-driving circuit for detecting a touch position and a touch movement position for a touch-sensing area of the touch sensor, and for generating at least one touch coordinate data, and a display-driving circuit for analyzing image data to confirm characteristics including brightness characteristics, moving image characteristics, or still image characteristics of a displayed image, for dividing the image display area into first to k-th display areas according to the confirmed characteristics, for dividing the first display area into a first central area and a first peripheral area including a periphery of the first central area, for dividing the k-th display area into a second central area and a second peripheral area including a periphery of the second central area, and for controlling image display operations of the first to k-th display areas by modulating luminance values of image data respectively displayed in the first central area, the first peripheral area, the second central area, and the second peripheral area.

The first central area may include about 60% to about 90% of pixels in the first display area, wherein the first peripheral area includes about 10% to about 40% of the pixels in the first display area.

The second central area may include about 60% to about 90% of pixels in the k-th display area, wherein the second peripheral area includes about 10% to about 40% of the pixels in the k-th display area.

The display-driving circuit may include a data sorter for analyzing characteristics including the brightness characteristics, the moving image characteristics, or the still image characteristics of the displayed image, and for dividing the image display area into the first to k-th display areas, a data modulator for receiving image data sorted from the data sorter and pixel coordinate information on the first to k-th display areas divided in units of at least one frame, and for generating modulated image data in units of at least one frame by modulating or maintaining luminance values of image data for each pixel respectively corresponding to the first to k-th display areas according to a percentage according to a modulation luminance range, and a DA modulation output for converting image data for each pixel of the modulated image data into data voltages, and for supplying the data voltages into data lines to which the respective pixels are connected.

The data sorter may be configured to divide the first display area into the first central area and the first peripheral area, to divide the k-th display area into the second central area and the second peripheral area, and to generate the pixel coordinate information on the first central area, the first peripheral area, the second central area, and the second peripheral area.

The data modulator may be configured to generate modulated image data for each pixel corresponding to the first central area by maintaining luminance values of image data for each pixel corresponding to the first central area according to a percentage according to a first modulation luminance range, wherein a maximum luminance value is maintained at about 100% compared to a minimum luminance value in the first modulation luminance range.

With a portable display device according to one or more embodiments, it is possible to increase power consumption reduction efficiency by reducing power consumption for each image display area according to brightness characteristics or moving image characteristics and still image characteristics of a displayed image in an image display period in which great power is consumed.

In addition, with the portable display device according to one or more embodiments, luminance ranges of a displayed image are modulated and output to be the same as, or different from, each other for each display area so as to correspond to characteristics of the displayed image, such that it is possible to reduce or minimize perceptivity of a user, and to increase power consumption reduction efficiency.

The aspects of the present disclosure are not limited to the aforementioned effects, and various other aspects are included in the present specification.

BRIEF DESCRIPTION OF THE DRAWINGS

The above and other aspects of the present disclosure will become more apparent by describing in detail embodiments thereof with reference to the attached drawings, in which.

DETAILED DESCRIPTION

Figure 1:
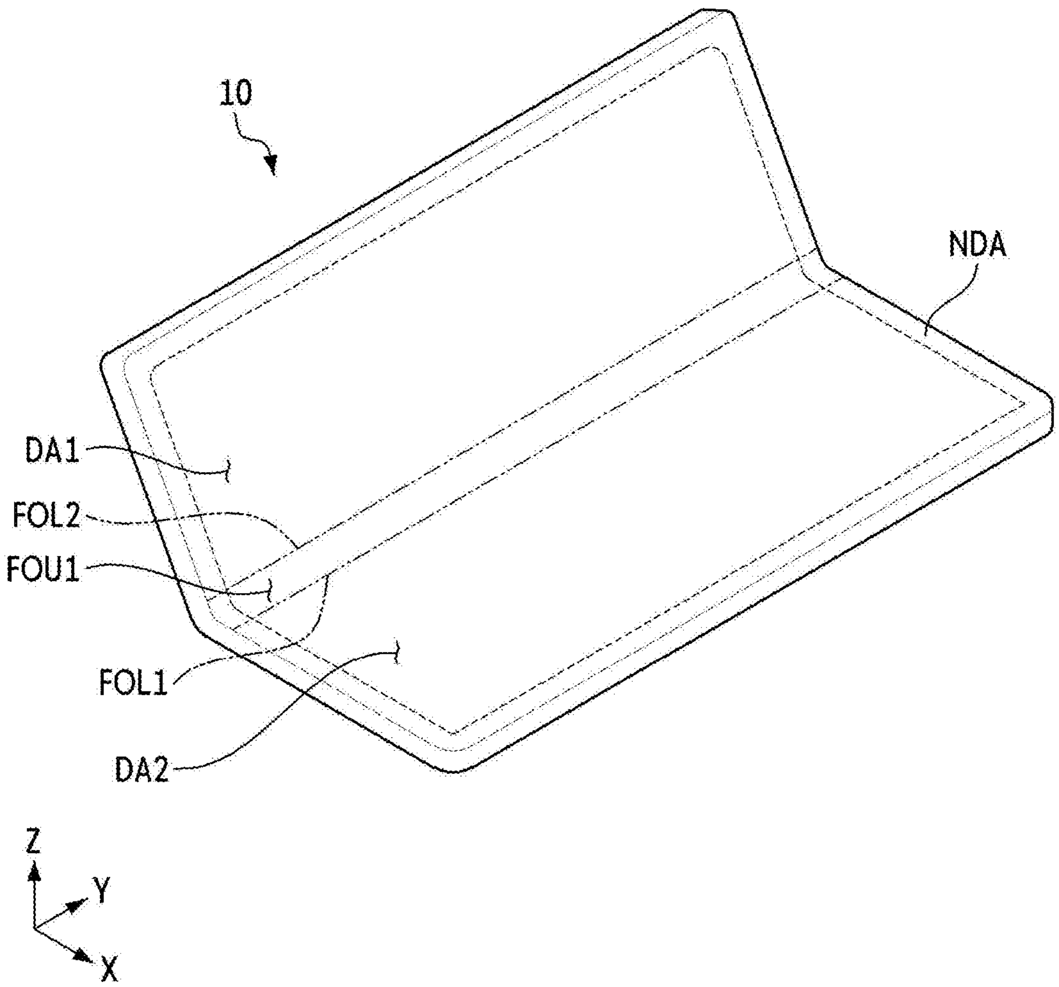
FIG. 1 is a perspective view illustrating a foldable portable display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or" "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view illustrating a foldable portable display device according to one or more embodiments of the present disclosure.

Referring to FIG. 1, a portable display device 10 (hereinafter referred to as a display device 10) according to one or more embodiments is a foldable display device, and may be applied to portable electronic devices, such as mobile phones, smartphones, tablet personal computers (PCs), mobile communication terminals, electronic notebooks, electronic books, portable multimedia players (PMPs), navigation devices, and ultra mobile PCS (UMPCs). Alternatively, the display device 10 according to one or more embodiments may be applied as a display unit of televisions, laptop computers, monitors, billboards, or the Internet of Things (IOTs).

In the present specification, a first direction (X-axis direction) may be a short side direction of the display device 10 that is folded, for example, a transverse direction of the display device 10. In addition, a second direction (Y-axis direction) may be a long side direction of the display device 10 that is folded, for example, a longitudinal direction of the display device 10. A third direction (Z-axis direction) may be a thickness direction of the display device 10.

It has been illustrated in FIG. 1 that the display device 10 is a foldable display device that may be folded once in the first direction (X-axis direction). The display device 10 may be transformed or maintained in a folded state where it is folded once, a flex state where it flexes only at a corresponding angle (e.g., predetermined angle), and a flat state where it is fully unfolded.

The display device 10 may be folded in an in-folding manner in which a front surface thereof, which is an image display surface, is located inside. When the display device 10 is bent or folded in the in-folding manner, front surfaces of the display device 10 may be located to face each other. Alternatively, the display device 10 may be folded in an out-folding manner in which a front surface thereof, which is an image display surface, is located outside. When the display device 10 is bent or folded in the out-folding manner, rear surfaces of the display device 10 may be located to face each other.

An image display area of the display device 10 may be divided into a plurality of non-folding areas DA1 and DA2 and a first folding area FOU1. As an example, the first folding area FOU1 may be located between first and second non-folding areas DA1 and DA2. An image non-display area NDA may be formed at an outer peripheral portion of the entire image display area, that is, outside the plurality of non-folding areas DA1 and DA2 and the first folding area FOU1.

The first folding area FOU1 may be located in a form in which it extends in the second direction (Y-axis direction) between the first and second non-folding areas DA1 and DA2, and may be folded in the in-folding manner or the out-folding manner in the first direction (X-axis direction). In other words, the first non-folding area DA1 may be located on one side, for example, the left side, of the first folding area FOU1. In addition, the second non-folding area DA2 may be located on the other side, for example, the right side, of the first folding area FOU1. The first folding area FOU1 and first and second folding lines FOL1 and FOL2 may extend in the second direction (Y-axis direction), and the display device 10 may be folded in the first direction (X-axis direction).

When the first folding area FOU1 is folded in the in-folding manner, front surfaces of the first and second non-folding areas DA1 and DA2 may be located to face each other. When the first folding area FOU1 extends in the second direction (Y-axis direction) and is in-folded or out-folded in the first direction (X-axis direction) as described above, a width of the display device 10 in the first direction (X-axis direction) may be reduced by approximately ½.

When the first folding area FOU1 and the first and second folding lines FOL1 and FOL2 are located in the first direction (X-axis direction) so as to extend in the second direction (Y-axis direction), a width of the first folding area FOU1 in the first direction (X-axis direction) is less than a length of the first folding area FOU1 in the second direction (Y-axis direction). In addition, a width of the first non-folding area DA1 in the first direction (X-axis direction) may be greater than the width of the first folding area FOU1 in the first direction (X-axis direction). A width of the second non-folding area DA2 in the first direction (X-axis direction) may also be greater than the width of the first folding area FOU1 in the first direction (X-axis direction).

An image display area of the display device 10 in a front surface direction may overlap the first non-folding area DA1, the first folding area FOU1, and the second non-folding area DA2. Therefore, when the display device 10 is unfolded as illustrated in FIG. 1, an image may be displayed in the front surface direction in the first non-folding area DA1, the first folding area FOU1, and the second non-folding area DA2 of the display device 10.

Figure 2:
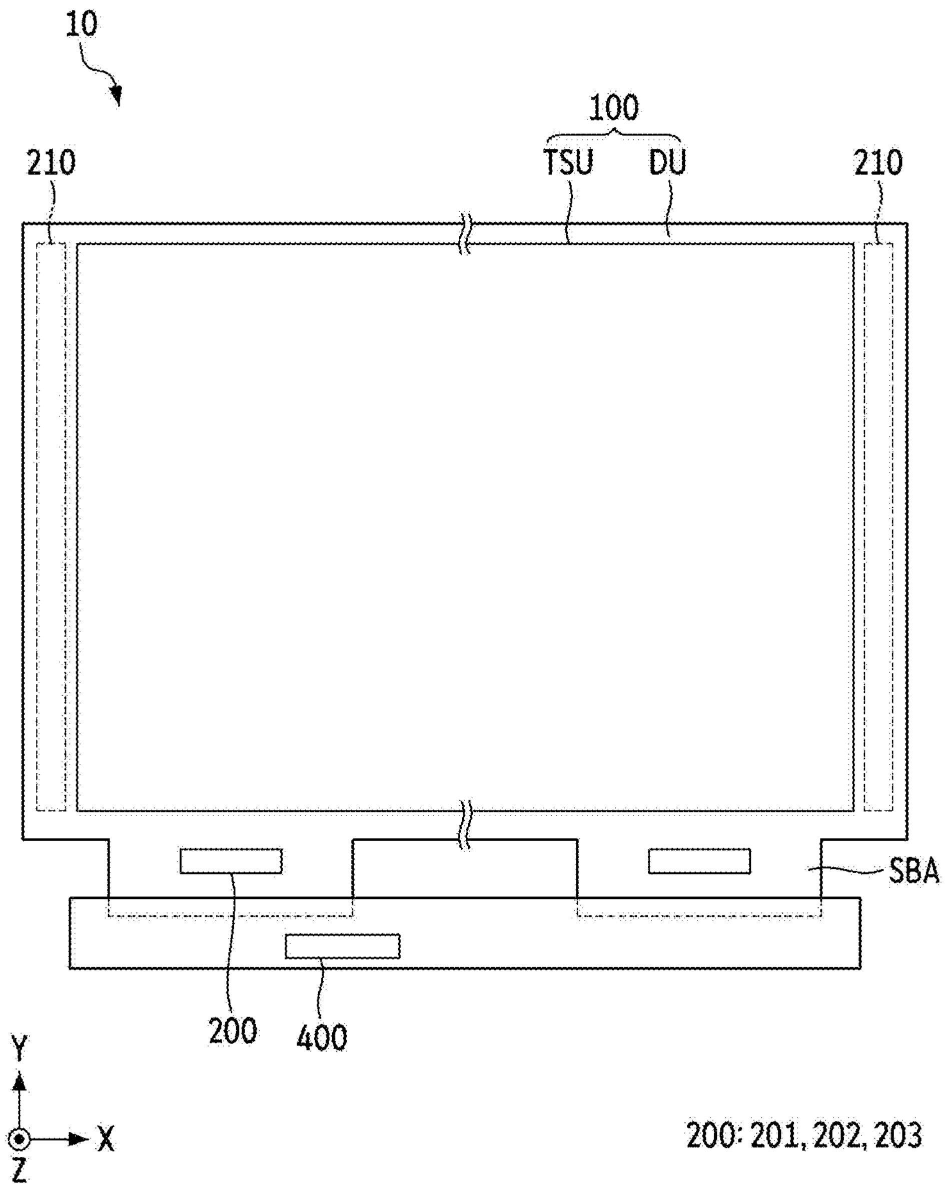
FIG. 2 is a plan view illustrating a configuration of a portable display device according to one or more embodiments of the present disclosure.

FIG. 2 is a plan view illustrating a configuration of a portable display device according to one or more embodiments of the present disclosure. In addition, FIG. 3 is a side cross-sectional view illustrating the portable display device illustrated in FIG. 2 in detail.

Figure 3:
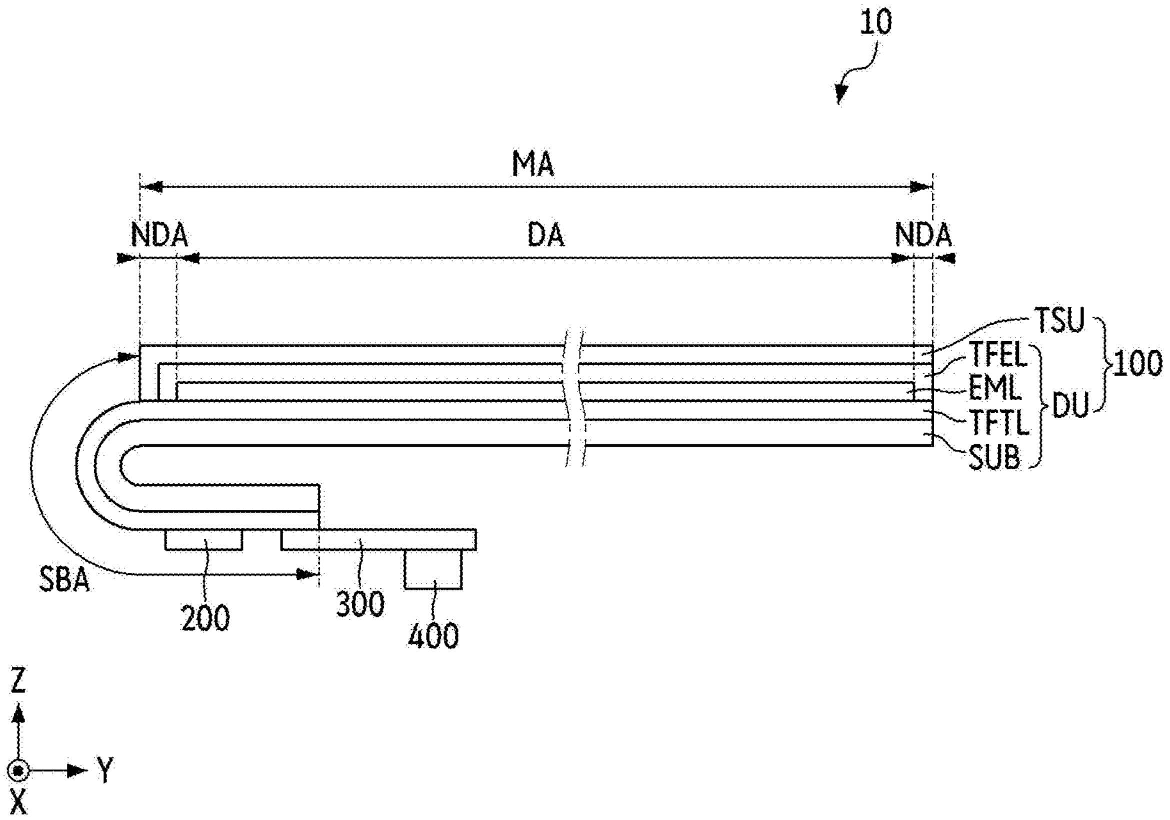
FIG. 3 is a side cross-sectional view illustrating the portable display device illustrated in FIG. 2 in detail.

Referring to FIGS. 2 and 3, the display device 10 according to one or more embodiments may be variously classified according to a display method. For example, the display device 10 may be classified and configured into an organic light-emitting display (OLED), an inorganic light-emitting display (inorganic EL), a quantum dot light-emitting display (QED), a micro light-emitting diode (LED) display (micro-LED), a nano LED display (nano-LED), a plasma display panel (PDP), a field emission display (FED), a liquid crystal display (LCD), an electrophoretic display (EPD), and the like. Hereinafter, an organic light-emitting display (OLED) will be described as an example of the display device 10 according to one or more embodiments, and an organic light-emitting display (OLED) applied to one or more embodiments will be abbreviated as a display device 10 unless special distinction is required. The display device 10 according to one or more embodiments is not limited to the organic light-emitting display (OLED), and may be other display devices mentioned above or known in the art without departing from the technical idea.

As illustrated in FIGS. 2 and 3, the display device 10 includes a touch-sensing module, and the touch-sensing module includes a touch sensor (e.g., a touch-sensing unit) TSU located on a front surface of a display panel 100 and at least one touch-driving circuit 400 generating touch coordinate data of the touch sensor TSU.

For example, the display panel 100 of the display device 10 includes a display unit DU for displaying an image, and the touch sensor TSU for sensing a touch by a body part, such as a finger, and for sensing a touch input device, such as an electronic pen, is located on the display unit DU of the display panel 100.

The display unit DU of the display panel 100 may include a plurality of pixels, and may display the image through the plurality of pixels. Here, each pixel may include red, green, and blue pixels or include red, green, blue, and white pixels.

The touch sensor TSU may be mounted in a front surface direction of the display panel 100, or may be formed integrally with the display panel 100 on a front surface portion of the display panel 100. The touch sensor TSU may include a plurality of touch electrodes, and may sense a user's touch in a capacitive manner using the touch electrodes. The touch sensor TSU may be mounted on the display unit DU of the display panel 100, or may be formed integrally with the display unit DU.

The touch-driving circuit 400 may be formed as at least one microprocessor type electrically connected to the touch sensor TSU, that is, each touch-sensing area. The touch-driving circuit 400 may supply touch-driving signals to the touch electrodes arranged in a matrix structure in the touch sensor TSU, and may sense change amounts in capacitance between the touch electrodes. The touch-driving circuit 400 may confirm a user's touch input based on the change amounts in capacitance between the touch electrodes and calculate touch coordinate data.

A display-driving circuit 200 may control an overall function of the display device 10. As an example, the display-driving circuit 200 may receive the touch coordinate data for the touch sensor TSU from the touch-driving circuit 400, may decide user's touch coordinates, and may generate digital video data according to the touch coordinates. In addition, the display-driving circuit 200 may execute an application indicated by an icon displayed at user's touch coordinates. As another example, the display-driving circuit 200 may receive coordinate data from an electronic pen or the like, may decide touch coordinates of the electronic pen, and then may generate digital video data according to the touch coordinates, or may execute an application indicated by an icon displayed at the touch coordinates of the electronic pen.

The display-driving circuit 200 may output control signals and data voltages for driving pixels located in an image display area DA of the display unit DU, for example, pixels each divided into red, green, blue, and white pixels. The display-driving circuit 200 may supply the data voltages to data lines to which the pixels are connected.

The display-driving circuit 200 modulates image display luminance according to an analysis result of characteristics, such as brightness characteristics, moving image characteristics, and still image characteristics of a displayed image to reduce power that is consumed to display the image in the image display area DA, that is, power that is consumed to drive the respective pixels. For example, the display-driving circuit 200 sorts and confirms image data input from the outside in units of at least one frame to confirm characteristics, such as brightness characteristics of each part, moving image characteristics, and still image characteristics of the displayed image displayed in the image display area DA. In addition, the display-driving circuit 200 divides the image display area DA into first to k-th display areas according to the confirmed characteristics of the display image. Here, k may be a natural number that is greater than 1 or a positive integer greater than 1.

The display-driving circuit 200 may compare grayscale values for each pixel of the image data sorted in units of at least one frame with at least one reference grayscale value (e.g., preset reference grayscale value), and may divide the image display area DA into the first to k-th display areas according to a comparison result. As another example, the display-driving circuit 200 may compare the image data sorted in units of at least one frame with image data for each of a plurality of previous frames, may divide a moving image display area and a still image display area, and may divide the image display area DA into the first to k-th display areas according to a division result.

In addition, the display-driving circuit 200 divides central areas and peripheral areas for each of the divided first to k-th display areas. In addition, the display-driving circuit 200 modulates grayscale values or luminance values of the image data in units of at least one frame so as to correspond to the first to k-th display areas and the central areas and the peripheral areas for each of the first to k-th display areas.

The display-driving circuit 200 supplies source voltage to power lines, and supplies gate control signals to at least one gate driver 210. In addition, the display-driving circuit 200 converts image data for each pixel modulated to correspond to the first to k-th display areas and the central areas and the peripheral areas for each of the first to k-th display areas into analog data voltages, and supplies the analog data voltages to the data lines to which the respective pixels are connected.

Meanwhile, in the display-driving circuit 200, a timing controller performing a timing control function and a data driver supplying the data voltages to the data lines may be separately distinguished from each other. In this case, the display-driving circuit 200 may control driving timings of the gate driver 210 and the data driver by supplying timing control signals to at least one gate driver 210 and the data driver.

Referring to FIG. 3, the display panel 100 may be divided into a main area MA and a sub-area SBA. The main area MA may include an image display area DA including pixels for displaying an image, and a non-display area NDA located around the image display area DA. In the image display area DA, an image may be displayed by emitting light from emission areas or opening areas of the respective pixels. To this end, the pixels arranged in the image display area DA may include pixel circuits including switching elements, a pixel-defining layer defining the emission areas or the opening areas, and self-light-emitting elements.

The non-display area NDA may be a peripheral area of the image display area DA, that is, an area outside the image display area DA. The non-display area NDA may be defined as an edge area of the main area MA corresponding to the image display area DA of the display panel 100. In one or more embodiments, the non-display area NDA may include at least one gate driver 210 for supplying gate signals to gate lines and fan-out lines connecting the display-driving circuit 200 and the image display area DA to each other.

The sub-area SBA may extend from one side of the main area MA. The sub-area SBA may include a flexible material that may be bent, folded, and rolled. For example, when the sub-area SBA is bent, the sub-area SBA may overlap the main area MA in the thickness direction (Z-axis direction). The sub-area SBA may include the display-driving circuit 200 and pad portions connected to a circuit board 300. Alternatively, the sub-area SBA may be omitted, and the display-driving circuit 200 and the pad portions may be located in the non-display area NDA.

The circuit board 300 may be attached onto the pad portions of the display panel 100 using an anisotropic conductive film (ACF). Lead lines of the circuit board 300 may be electrically connected to the pad portions of the display panel 100. The circuit board 300 may be a flexible printed circuit board, a printed circuit board, or a flexible film, such as a chip on film.

Meanwhile, a substrate SUB of the display panel 100 illustrated in FIG. 3 may be a base substrate or a base member. The substrate SUB may be a flat-type substrate. Alternatively, the substrate SUB may be a flexible substrate that may be bent, folded, and rolled. As an example, the substrate SUB may include a glass material or a metal material, but is not limited thereto. As another example, the substrate SUB may include a polymer resin, such as polyimide (PI).

A thin film transistor layer TFTL may be located on the substrate SUB (as used herein, “located on” may mean “above”). The thin film transistor layer TFTL may include a plurality of thin film transistors constituting a pixel circuit of each of the pixels. The thin film transistor layer TFTL may further include gate lines, data lines, power lines, gate control lines, fan-out lines connecting the display-driving circuit 200 and the data lines to each other, and lead lines connecting the display-driving circuit 200 and the pad portions to each other. When the gate drivers 210 are formed on one side and the other side of the non-display area NDA of the display panel 100, respectively, the respective gate drivers 210 may also include thin film transistors.

The thin film transistor layer TFTL may be selectively located in the image display area DA, the non-display area NDA, and the sub-area SBA. The thin film transistors of each of the pixels, the gate lines, the data lines, and the power lines of the thin film transistor layer TFTL may be located in the image display area DA. The gate control lines and the fan-out lines of the thin film transistor layer TFTL may be located in the non-display area NDA. The lead lines of the thin film transistor layer TFTL may be located in the sub-area SBA.

A light-emitting element layer EML may be located on the thin film transistor layer TFTL. The light-emitting element layer EML may include a plurality of light-emitting elements in which a first electrode, a light-emitting layer, and a second electrode are sequentially stacked to emit light, and a pixel-defining layer defining the respective pixels. The light-emitting elements of the light-emitting element layer EML may be located in the image display area DA.

An encapsulation layer TFEL may cover an upper surface and side surfaces of the light-emitting element layer EML, and may protect the light-emitting element layer EML. The encapsulation layer TFEL may include at least one inorganic layer and at least one organic layer for encapsulating the light-emitting element layer EML.

The touch sensor TSU including a touch-sensing area may be located on the encapsulation layer TFEL of the display panel 100. The touch-sensing area of the touch sensor TSU may include a plurality of touch electrodes for sensing a user’s touch in a capacitive manner and touch-driving lines connecting the plurality of touch electrodes and at least one touch-driving circuit 400 to each other. In each touch-sensing area, the touch electrodes may be arranged in a matrix structure to sense the user’s touch in a self-capacitance manner or a mutual capacitance manner.

The touch sensor TSU might not be formed integrally with the display panel 100, and may be located on a separate substrate or film located on the display unit DU of the display panel 100. In this case, the substrate or the film supporting the touch sensor TSU may be a base member for encapsulating the display unit DU. Hereinafter, an example in which the touch sensor TSU is formed integrally with the display panel 100 on a front surface of the display panel 100 will be described.

The plurality of touch electrodes may be located in the touch-sensing area overlapping the image display area DA.

On the other hand, touch lines for transmitting touch-driving signals or touch-sensing signals may be located in a touch peripheral area overlapping the non-display area NDA.

The touch-driving circuit 400 generating the touch coordinate data for the touch-sensing area may be located in the non-display area NDA or the sub-area SBA of the display panel 100. Alternatively, the touch-driving circuit 400 generating the touch coordinate data may be mounted on a separate circuit board 300. Such a touch-driving circuit 400 may be formed as an integrated circuit (IC).

The touch-driving circuit 400 supplies the touch-driving signals to the touch electrodes of the touch-sensing area overlapping the image display area DA, and measures a charge change amount of mutual capacitance of each of a plurality of touch nodes formed by the touch electrodes. In this case, the touch-driving circuit 400 measures changes in capacitance of the touch nodes according to changes in voltage magnitude or current amount of the touch-sensing signals received through the touch electrodes. As such, the touch-driving circuit 400 may decide a user's touch position according to the charge change amount of the mutual capacitance of each of the touch nodes. Here, the touch-driving signal may be a pulse signal having a corresponding frequency (e.g., predetermined frequency). The touch-driving circuit 400 calculates a touch input and touch coordinates by a touch input device or a user's body part, such as a finger, for each touch-sensing area based on a change amount in capacitance between the touch electrodes for each touch-sensing area.

Figure 4:
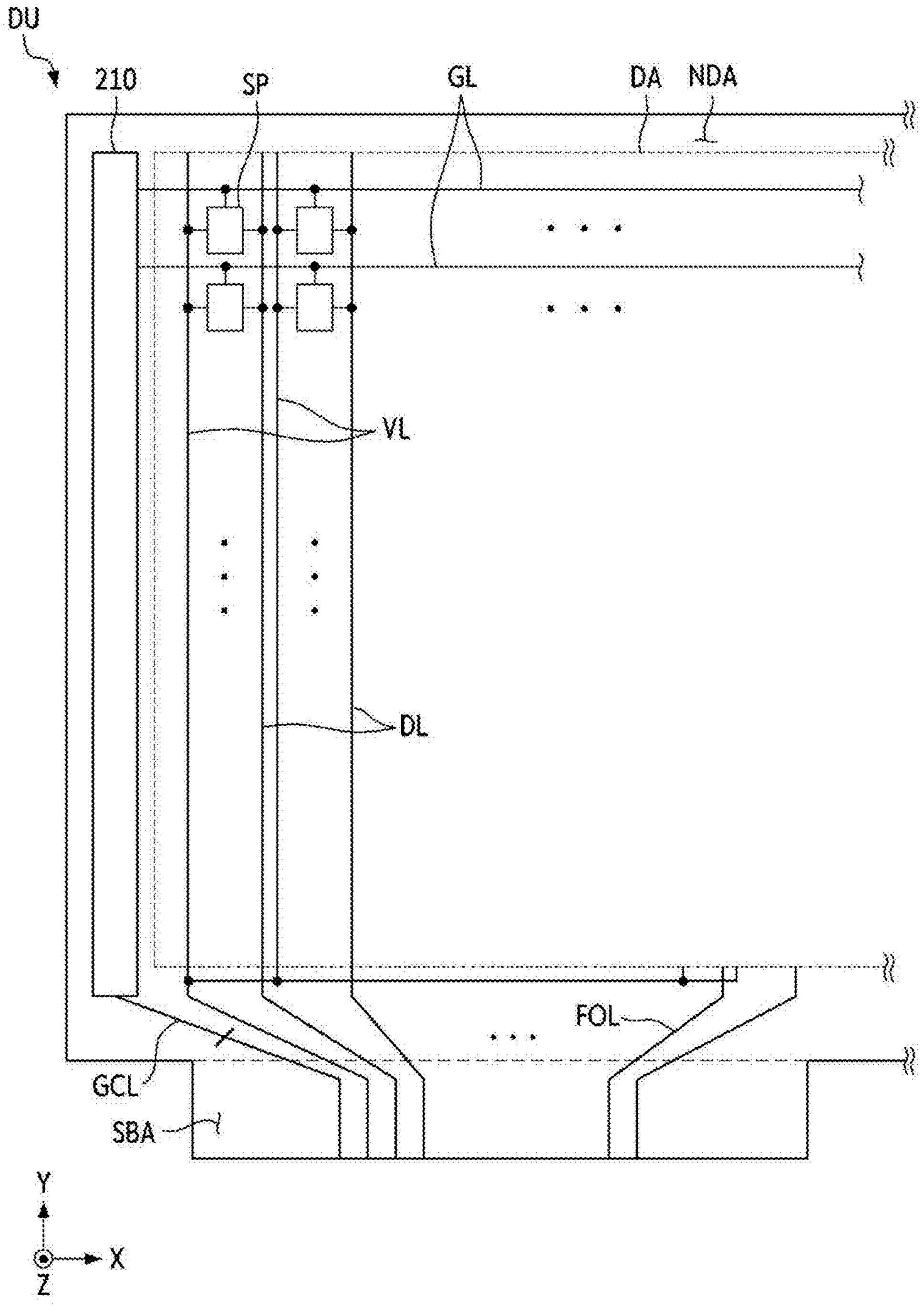
FIG. 4 is a schematic layout diagram illustrating an example of a display panel according to one or more embodiments.

FIG. 4 is a schematic layout diagram illustrating an example of a display panel according to one or more embodiments. For example, FIG. 4 is a layout diagram partially illustrating an image display area DA and a non-display area NDA of the display unit DU in a state before the touch sensor TSU is formed.

The image display area DA may be located as a (generally) central area including a central portion of the display panel 100. As an example, the image display area DA may include a plurality of pixels SP, a plurality of gate lines GL, a plurality of data lines DL, a plurality of power lines VL, and the like. Each of the plurality of pixels SP may be defined as a minimum unit for outputting light, such as red light, green light, blue light, or white light.

The plurality of gate lines GL may supply gate signals received from at least one gate driver 210 to the plurality of pixel SP. The plurality of gate lines GL may extend in the X-axis direction, and may be spaced apart from each other in the Y-axis direction crossing the X-axis direction.

The plurality of data lines DL may supply data voltages received from the display-driving circuit 200 to the plurality of pixels SP. The plurality of data lines DL may extend in the Y-axis direction and may be spaced apart from each other in the X-axis direction.

The plurality of power lines VL may supply a source voltage applied from the display-driving circuit 200 or a separate power supply unit to the plurality of pixels SP. Here, the source voltage may be at least one of a driving voltage, an initialization voltage, or a reference voltage. The plurality of power lines VL may extend in the Y-axis direction, and may be spaced apart from each other in the X-axis direction.

The non-display area NDA is a peripheral area of the image display area DA surrounding the image display area DA (e.g., in plan view), and may finally be defined as a bezel area. The non-display area NDA may include the gate driver 210, fan-out lines FOL, and gate control lines GCL. The gate driver 210 may generate a plurality of gate signals based on gate control signals, and may sequentially supply the plurality of gate signals to the plurality of gate lines GL according to a set order.

The fan-out lines FOL may extend from the display-driving circuit 200 to each image display area DA. The fan-out lines FOL may supply the data voltages received from the display-driving circuit 200 to the plurality of data lines DL. The gate control lines GCL may extend from the display-driving circuit 200 to the gate driver 210. The gate control lines GCL may supply the gate control signals received from the display-driving circuit 200 to the gate driver 210.

The display-driving circuit 200 may output control signals and data voltages for driving the display panel 100 to the fan-out lines FOL. The display-driving circuit 200 may supply the data voltages to the data lines DL through the fan-out lines FOL. The data voltages may be supplied to the plurality of pixels SP, and may determine display luminance for each of the plurality of pixels SP. The display-driving circuit 200 may supply the gate control signals to the gate driver 210 through the gate control lines GCL.

Figure 5:
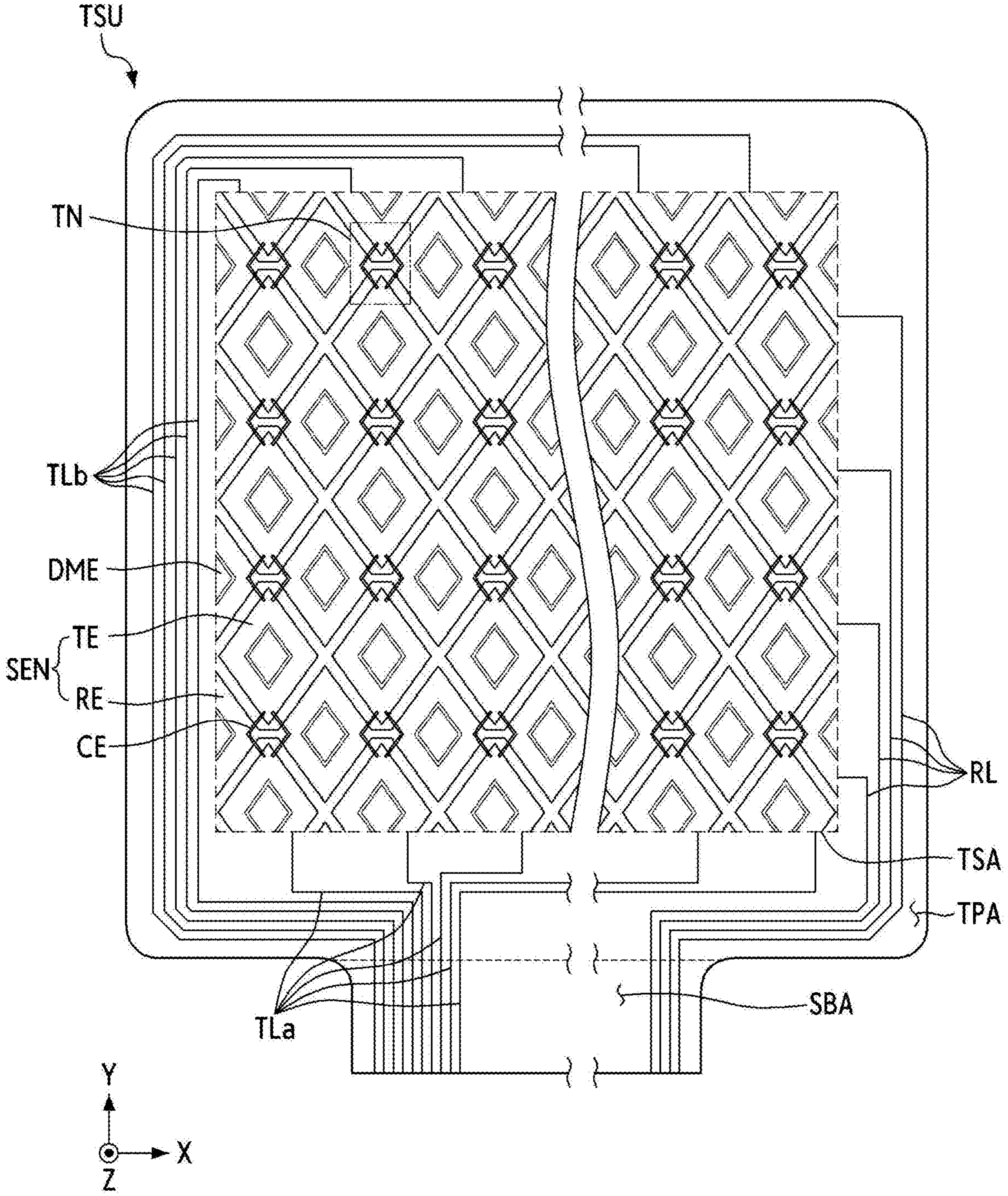
FIG. 5 is a schematic layout diagram illustrating an example of a touch sensor according to one or more embodiments.

FIG. 5 is a schematic layout diagram illustrating an example of a touch sensor according to one or more embodiments. For example, FIG. 5 is a layout diagram illustrating a planar structure of the touch-sensing area TSA corresponding to the image display area DA.

Referring to FIG. 5, the touch sensor TSU may include a touch-sensing area TSA sensing a user's touch and a touch peripheral area TPA defined as a peripheral area of the touch-sensing area TSA.

The touch-sensing area TSA may cover the image display area DA and the non-display area NDA of the display unit DU to overlap the image display area DA and the non-display area NDA. Because the non-display area NDA is the bezel area, outer areas of the touch-sensing area TSA overlapping and corresponding to the non-display area NDA correspond to the bezel area.

The touch peripheral area TPA corresponds to an area where the gate driver 210 is located. Accordingly, the touch-sensing area TSA extends on, overlaps, and is located on the non-display area NDA except for the area where the gate driver 210 is located.

The touch-sensing area TSA may include a plurality of touch electrodes SEN and a plurality of dummy electrodes DME. The plurality of touch electrodes SEN may form mutual capacitance or self-capacitance to sense a touch of an object or a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through a plurality of connection electrodes CE.

The plurality of driving electrodes TE may be connected to first touch pads through driving lines TL. The driving lines TL may include lower driving lines TLa and upper driving lines TLb. For example, some driving electrodes TE located on the lower side of the touch-sensing area TSA may be connected to the first touch pads through the lower driving lines TLa, and some other driving electrodes TE located on the upper side of the touch-sensing area TSA may be connected to the first touch pads through the upper driving lines TLb. The lower driving lines TLa may extend to the first touch pads via the lower side of the touch peripheral area TPA. The upper driving lines TLb may extend to the first touch pads via the upper side, the left side, and the lower side of the touch peripheral area TPA. In one or more embodiments, touch pads may be pads formed on the circuit board 300 or the like and connected to at least one touch-driving circuit 400.

The driving electrodes TE adjacent to each other in the Y-axis direction may be electrically connected to each other by the plurality of connection electrodes CE, and even though any one of the plurality of connection electrodes CE is disconnected, the driving electrodes TE may be stably connected to each other through the other connection electrodes CE. The driving electrodes TE adjacent to each other may be connected to each other by two connection electrodes CE, but the number of connection electrodes CE is not limited thereto. The connection electrode CE may be bent at least once. For example, the connection electrode CE may have a clamp shape ("<" or ">"), but a shape of the connection electrode CE in plan view is not limited thereto.

The connection electrodes CE may be located at a different layer from the plurality of driving electrodes TE and the plurality of sensing electrodes RE. The driving electrodes TE adjacent to each other in the Y-axis direction may be electrically connected to each other through the connection electrodes CE located at the different layer from the plurality of driving electrodes TE and the plurality of sensing electrodes RE. The connection electrodes CE may be formed at a rear surface layer (or a lower layer) of a layer at which the driving electrodes TE and the sensing electrodes RE are formed. The connection electrodes CE are electrically connected to the respective adjacent driving electrodes TE through a plurality of contact holes. Accordingly, even though the connection electrodes CE overlap the plurality of sensing electrodes RE in the Z-axis direction, the plurality of driving electrodes TE and the plurality of sensing electrodes RE may be insulated from each other. Mutual capacitance may be formed between the driving electrodes TE and the sensing electrodes RE.

The sensing electrodes RE adjacent to each other in the X-axis direction may be electrically connected to each other through connection portions located at the same layer as the plurality of driving electrodes TE or the plurality of sensing electrodes RE. That is, the plurality of sensing electrodes RE may extend in the X-axis direction, and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other through the connection portions.

Touch nodes TN may be formed in areas where the connection electrodes CE connecting the driving electrodes TE to each other and the connection portions of the sensing electrodes RE cross with each other, and may be arranged in a matrix form in the touch-sensing area TSA.

The plurality of sensing electrodes RE may be connected to second touch pads through sensing lines RL. For example, some sensing electrodes RE located on the right side of the touch-sensing area TSA may be connected to the second touch pads through the sensing lines RL. The sensing lines RL may extend to the second touch pads via the right side and the lower side of the touch peripheral area TPA. The second touch pads may be connected to at least one touch-driving circuit 400 through the circuit board 300.

Each of the plurality of dummy electrodes DME may be surrounded by the driving electrode TE or the sensing electrode RE. Each of the plurality of dummy electrodes DME may be spaced apart and insulated from the driving electrode TE or the sensing electrode RE. Accordingly, the dummy electrodes DME may be electrically floated.

The touch-driving circuit 400 supplies the touch-driving signals to the plurality of driving electrodes TE. In addition, the touch-driving circuit 400 receives signals fed back from each of the plurality of driving electrodes TE as touch-sensing signals of the driving electrodes TE, and receives touch-sensing signals for the sensing electrodes RE from each of the plurality of sensing electrodes RE. Accordingly, the touch-driving circuit 400 measures a charge change amount of mutual capacitance of each of the touch nodes TN formed by the plurality of driving electrodes TE and the plurality of sensing electrodes RE by measuring changes in magnitude of the touch-sensing signals received from the plurality of driving electrodes TE and the plurality of sensing electrodes RE. The touch-driving circuit 400 may decide a user's touch position and touch movement direction according to the charge change amount of the mutual capacitance of each of the touch nodes. As such, the touch-driving circuit 400 calculates the touch input and the touch coordinates by the touch input device or the user's body part, such as the finger, for each touch-sensing area based on a change amount in capacitance between the touch electrodes.

Figure 6:
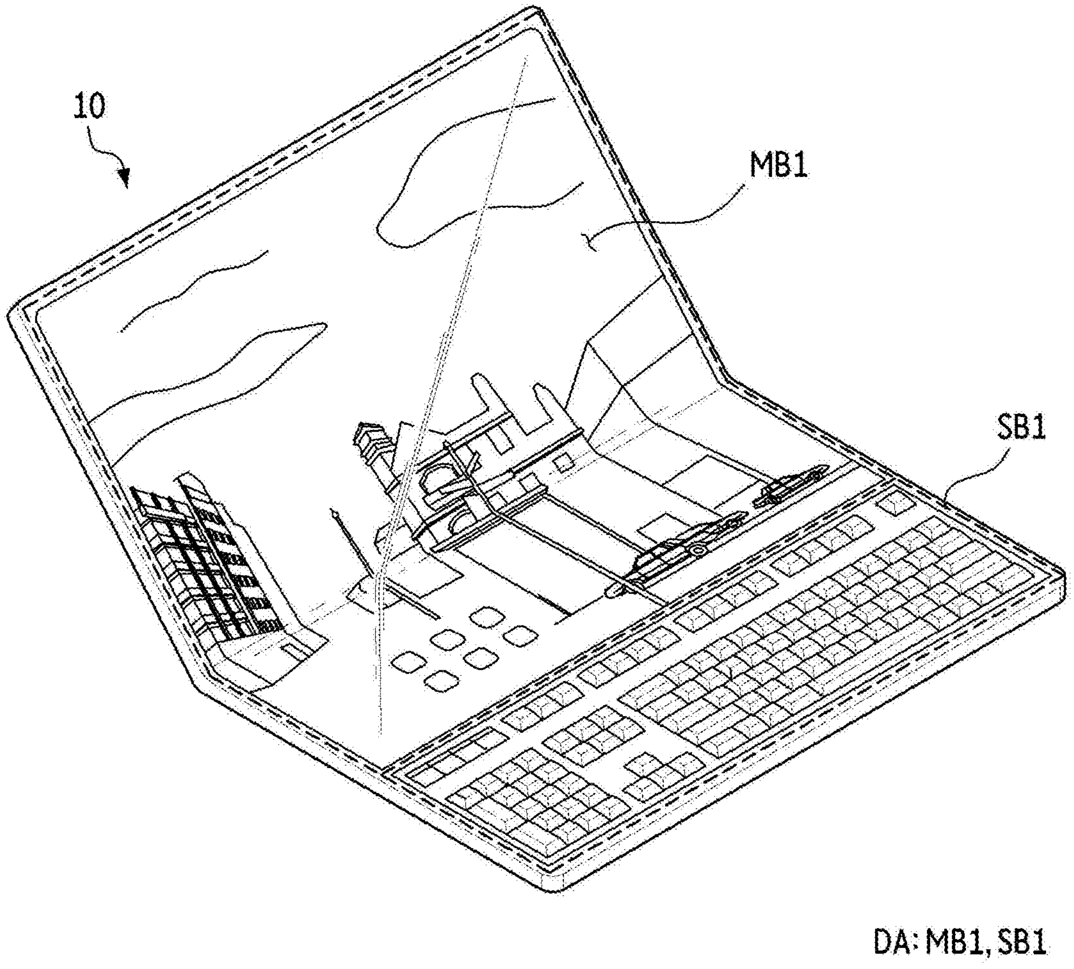
FIG. 6 is a perspective view of first one or more embodiments illustrating a plurality of display areas divided in an image display area of FIGS. 3 and 4.

FIG. 6 is a perspective view of first one or more embodiments illustrating a plurality of display areas divided in an image display area of FIGS. 3 and 4.

Referring to FIG. 6, the display-driving circuit 200 sorts and analyzes image data input from the outside in units of at least one frame to confirm characteristics, such as brightness characteristics of each part, moving image characteristics, and still image characteristics of a displayed image that is displayed in the image display area DA.

As an example, the display-driving circuit 200 may compare grayscale values for each pixel of the image data sorted in units of at least one frame with at least one reference grayscale value, and may divide the image display area DA into the first to k-th display areas MB1 and SB1 according to a comparison result.

For example, the display-driving circuit 200 may divide an area where pixels, which have grayscale values that are greater than a first reference grayscale value among the grayscale values for each pixel of the image data sorted in units of at least one frame, are located as the first display area MB1. In addition, the display-driving circuit 200 may divide an area where pixels having grayscale values that are less than the first reference grayscale value among the grayscale values for each pixel of the image data are located as the k-th display area SB1. Alternatively, the display-driving circuit 200 may compare the image data sorted in units of at least one frame with image data for each of a plurality of previous frames, may divide a moving image display area and a still image display area according to the number of times of grayscale value change in units of at least one frame, and may divide the image display area DA into the first to k-th display areas MB1 and SB1 according to a division result. Here, k may be a natural number of 2 or more or a positive integer that is greater than 1.

For example, the display-driving circuit 200 may compare the image data sorted in units of at least one frame with the image data for each of the plurality of previous frames to divide an area where pixels of which grayscale values change in units of a plurality of frames (e.g., preset frames) are located as the moving image display area. In addition, the display-driving circuit 200 may divide the moving image display area as the first display area MB1. Here, image data of at least one frame are compared with image data of the previous frame of the same pixel position.

On the other hand, the display-driving circuit 200 may compare the image data sorted in units of at least one frame with the image data for each of the plurality of previous frames to divide an area where pixels of which grayscale values are identically maintained in units of the plurality of frames are located as the still image display area. In addition, the display-driving circuit 200 may divide the still image display area as the k-th display area SB1.

Figure 7:
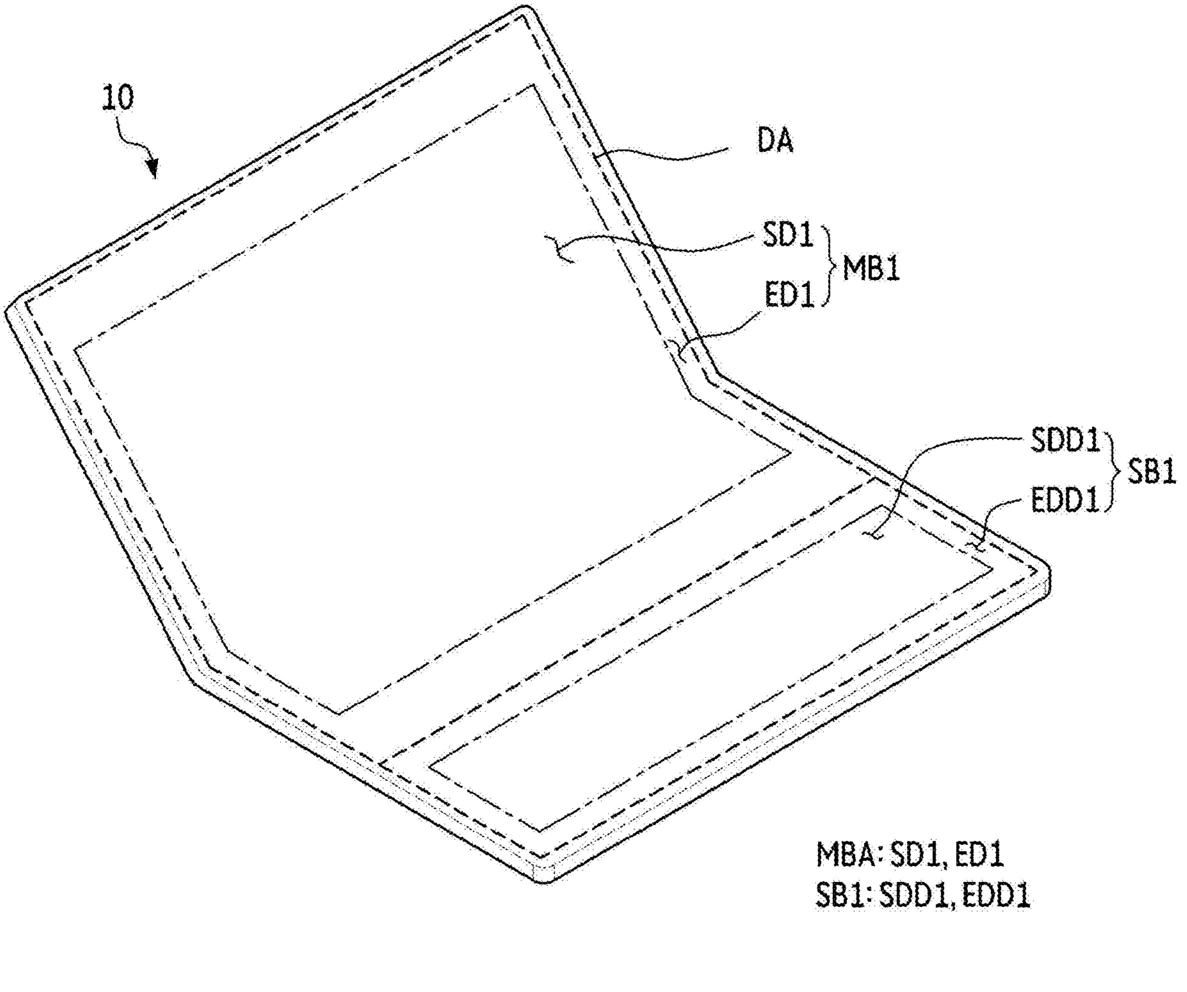
FIG. 7 is a perspective view of one or more embodiments illustrating central areas and peripheral areas divided in the plurality of display areas of FIG. 6.

FIG. 7 is a perspective view of one or more embodiments illustrating central areas and peripheral areas divided in the plurality of display areas of FIG. 6.

Referring to FIG. 7, the display-driving circuit 200 divides central areas SD1 and SDD1 and peripheral areas ED1 and EDD1 for each of the divided first to k-th display areas MB1 and SB1.

Each of the central areas SD1 and SDD1 for each of the first to k-th display areas MB1 and SB1 may be divided in any one polygonal shape (e.g., preset polygonal shape), such as a square shape, a rectangular shape, or an equilateral triangular shape in plan view, or may be divided in a circular shape or an elliptical shape in plan view. An example in which the central areas SD1 and SDD1 for each of the first to k-th display areas MB1 and SB1 are divided in a rectangular shape in plan view will be described with reference to FIG. 7 and the like.

For example, the display-driving circuit 200 divides the divided first display area MB1 into a first central area SD1 including a central portion (or a center point) of the first display area MB1 and a first peripheral area ED1 including the upper, lower, left, and right peripheries of the first central area SD1.

The first central area SD1 may be set to include the number of pixels SP at any one of about 60% to about 90% of the total number of pixels SP included in the first display area MB1, including the central portion (or the center point) of the first display area MB1. In addition, the first peripheral area ED1 may be set to include the number of pixels SP at any one of about 10% to about 40% of the total number of pixels SP included in the first display area MB1 by entirely surrounding the upper, lower, left, and right peripheries of the first display area MB1.

In addition, the display-driving circuit 200 divides the divided k-th display area SB1 into a second central area SDD1 including a central portion (or a center point) of the k-th display area SB1 and a second peripheral area EDD2 including the upper, lower, left, and right peripheries of the second central area SDD1.

The second central area SDD1 may be set to include the number of pixels SP at any one of about 60% to about 90% of the total number of pixels SP included in the k-th display area SB1, including the central portion (or the center point) of the k-th display area SB1. In addition, the second peripheral area EDD1 may be set to include the number of pixels SP at any one of about 10% to about 40% of the total number of pixels SP included in the k-th display area SB1 by entirely surrounding the upper, lower, left, and right peripheries of the k-th display area SB1.

The display-driving circuit 200 modulates grayscale values or luminance values of the image data in units of at least one frame so as to respectively correspond to the first central area SD1 and the first peripheral area ED1 of the first display area MB1 and the second central area SDD1 and the second peripheral area EDD1 of the k-th display area SB1. In addition, the display-driving circuit 200 converts image data for each pixel modulated to correspond to the first central area SD1 and the first peripheral area ED1 of the first display area MB1 and the second central area SDD1 and the second peripheral area EDD1 of the k-th display area SB1 into analog data voltages. The display-driving circuit 200 supplies the respective converted analog data voltages to the data lines to which the respective pixels are connected in units of at least one horizontal line.

Figure 8:
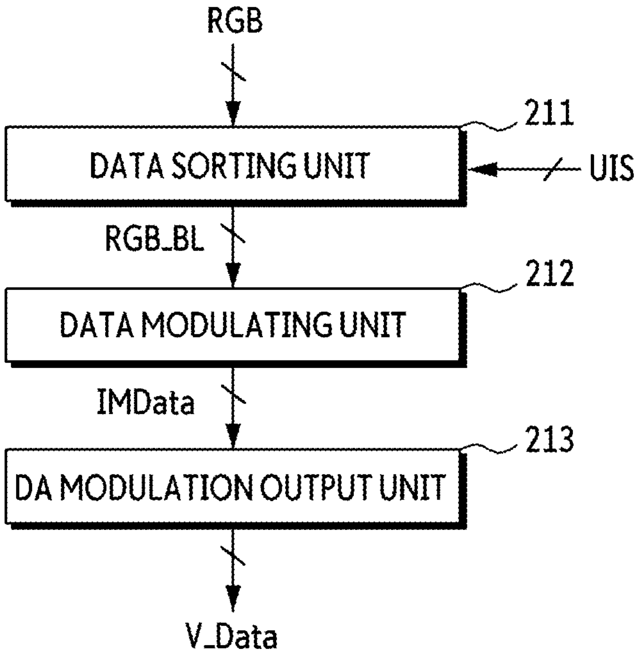
FIG. 8 is a block diagram illustrating some components of a display-driving device according to one or more embodiments of the present disclosure.

FIG. 8 is a block diagram illustrating some components of a display-driving device according to one or more embodiments of the present disclosure.

Referring to FIG. 8, the display-driving circuit 200 includes a data sorter (e.g., data-sorting unit) 211, a data modulator (e.g., data-modulating unit) 212, and a DA modulation output (e.g., DA modulation output unit) 213.

The data sorter 211 sorts image data RGB from the outside in units of at least one frame, analyzes at least one of brightness characteristics of each part, moving image characteristics, and/or still image characteristics of a displayed image, and divides the image display area DA into the first to k-th display areas MB1 and SB1.

As illustrated in FIG. 7, the data sorter 211 divides the first display area MB1 into the first central area SD1 including the central portion (or the center point) of the first display area MB1 and the first peripheral area ED1 including the upper, lower, left, and right peripheries of the first central area SD1.

In addition, the data sorter 211 divides the k-th display area SB1 into the second central area SDD1 including the central portion (or the center point) of the k-th display area SB1 and the second peripheral area EDD2 including the upper, lower, left, and right peripheries of the second central area SDD1.

The data sorter 211 transmits pixel coordinate information RGB_BL on the first central area SD1 and the first peripheral area ED1 of the first display area MB1 and on the the second central area SDD1 and the second peripheral area EDD1 of the k-th display area SB1 to the data modulator 212.

The data modulator 212 receives image data in units of at least one frame sorted from the data sorter 211 and the pixel coordinate information RGB_BL on the first to k-th display areas MB1 and SB1 divided in units of at least one frame. For example, the data modulator 212 may receive the pixel coordinate information RGB_BL on the first central area SD1 and the first peripheral area ED1 of the first display area MB1 and the second central area SDD1 and the second peripheral area EDD1 of the k-th display area SB1 divided in units of at least one frame.

The data modulator 212 makes reference to the pixel coordinate information RGB_BL. Accordingly, the data modulator 212 generates modulated image data IMData in units of at least one frame by modulating or maintaining luminance values of image data for each pixel respectively corresponding to the first central area SD1 and the first peripheral area ED1 of the first display area MB1 and the second central area SDD1 and the second peripheral area EDD1 of the k-th display area SB1 according to a percentage according to a modulation luminance range (e.g., preset modulation luminance range).

Figure 9:
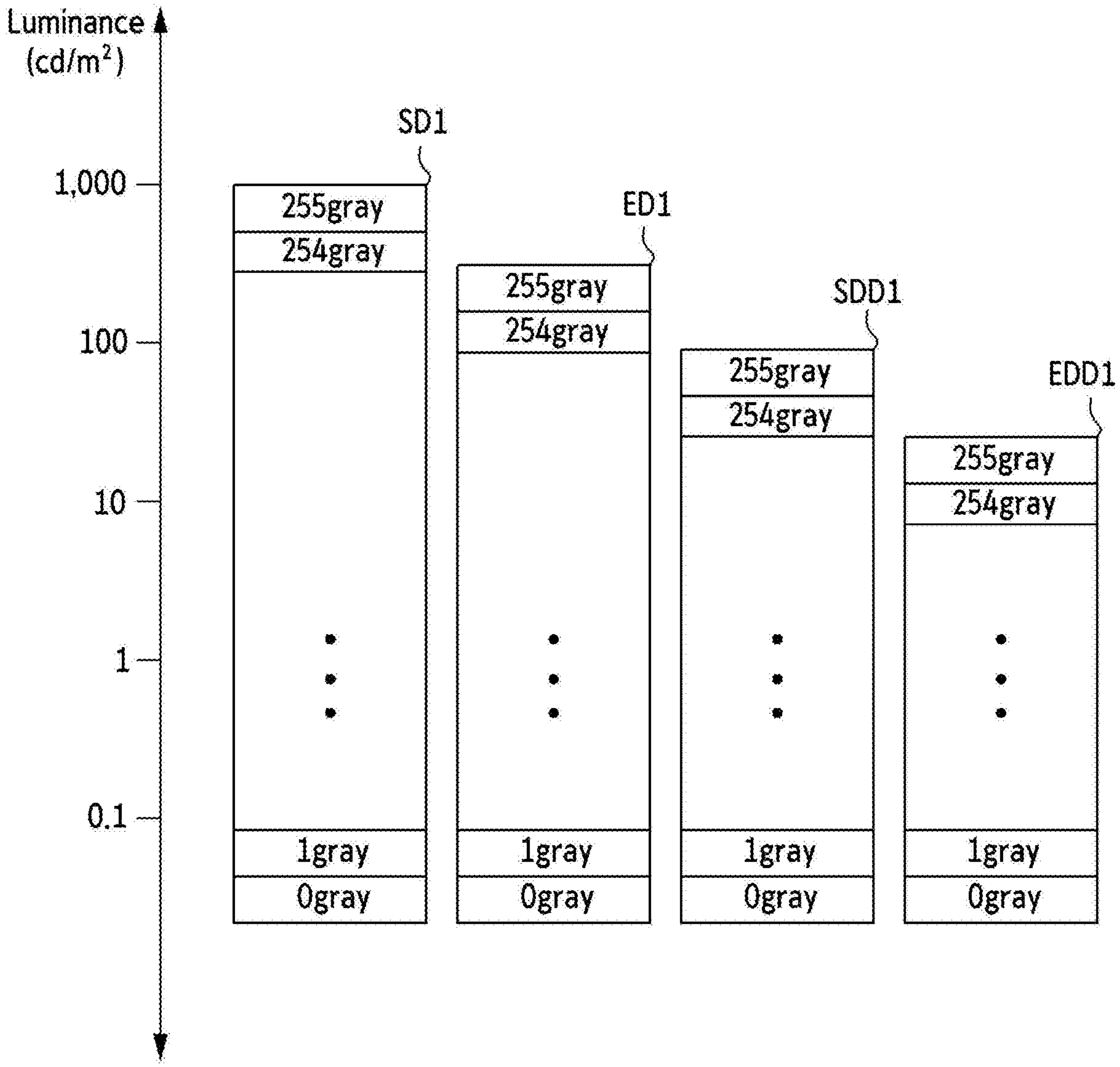
FIG. 9 is a diagram for describing a method of modulating luminance of image data displayed in the central areas and the peripheral areas for each display area illustrated in FIG. 7.

FIG. 9 is a diagram for describing a method of modulating luminance of image data displayed in the central areas and the peripheral areas for each display area illustrated in FIG. 7.

Referring to FIG. 9, the data modulator 212 generates modulated image data IMData for each pixel corresponding to the first central area SD1 by maintaining luminance values of image data for each pixel corresponding to the first central area SD1 of the first display area MB1 according to a percentage according to a first modulation luminance range. Here, the first modulation luminance range may be set to a luminance range of which a maximum luminance value is maintained at about 100% compared to a minimum luminance value (e.g., preset minimum luminance value).

Accordingly, the data modulator 212 may generate modulated image data IMData for each pixel corresponding to the first central area SD1 by maintaining luminance values compared to grayscale values (0 to 255 gray) of the image data for each pixel corresponding to the first central area SD1 as they are.

In addition, the data modulator 212 generates modulated image data IMData for each pixel corresponding to the first peripheral area ED1 by modulating luminance values of image data for each pixel corresponding to the first peripheral area ED1 of the first display area MB1 according to a percentage according to a second modulation luminance range. Here, the second modulation luminance range may be set to a luminance range of which a maximum luminance value is reduced to any one of about 99% to about 90% compared to the maximum luminance value of the first modulation luminance range. Accordingly, the data modulator 212 may generate modulated image data IMData for each pixel corresponding to the first peripheral area ED1 by modulating the luminance values compared to grayscale values (0 to 255 gray) of the image data for each pixel corresponding to the first peripheral area ED1 according to the percentage according to the second modulation luminance range.

In addition, the data modulator 212 generates modulated image data IMData for each pixel corresponding to the second central area SDD1 by modulating luminance values of image data for each pixel corresponding to the second central area SDD1 of the k-th display area SB1 according to a percentage according to a third modulation luminance range. Here, the third modulation luminance range may be set to a luminance range of which a maximum luminance value is reduced to any one of about 89% to about 80% compared to the maximum luminance value of the first modulation luminance range. Accordingly, the data modulator 212 may generate modulated image data IMData for each pixel corresponding to the second central area SDD1 by modulating the luminance values compared to grayscale values (0 to 255 gray) of the image data for each pixel corresponding to the second central area SDD1 according to the percentage according to the third modulation luminance range.

Meanwhile, the data modulator 212 may generate modulated image data IMData for each pixel corresponding to the second central area SDD1 by modulating luminance values of image data for each pixel corresponding to the second central area SDD1 of the k-th display area SB1 according to the percentage according to the second modulation luminance range like the first peripheral area ED1 of the first display area MB1.

In addition, the data modulator 212 generates modulated image data IMData for each pixel corresponding to the second peripheral area EDD1 by modulating luminance values of image data for each pixel corresponding to the second peripheral area EDD1 of the k-th display area SB1 according to a percentage according to a fourth modulation luminance range. Here, the fourth modulation luminance range may be set to a luminance range of which a maximum luminance value is reduced to any one of about 79% to about 70% compared to the maximum luminance value of the first modulation luminance range. Accordingly, the data modulator 212 may generate modulated image data IMData for each pixel corresponding to the second peripheral area EDD1 by modulating the luminance values compared to grayscale values (0 to 255 gray) of the image data for each pixel corresponding to the second peripheral area EDD1 according to the percentage according to the fourth modulation luminance range.

The DA modulation output 213 receives the modulated image data IMData modulated through the data modulator 212 in units of at least one horizontal line, and sorts the modulated image data IMData in units of at least one frame. In addition, the DA modulation output 213 converts image data for each pixel SP of the modulated image data IMData into data voltages V_Data, and supplies the converted data voltages V_Data into the data lines DL to which the respective pixels SP are connected.

Figure 10:
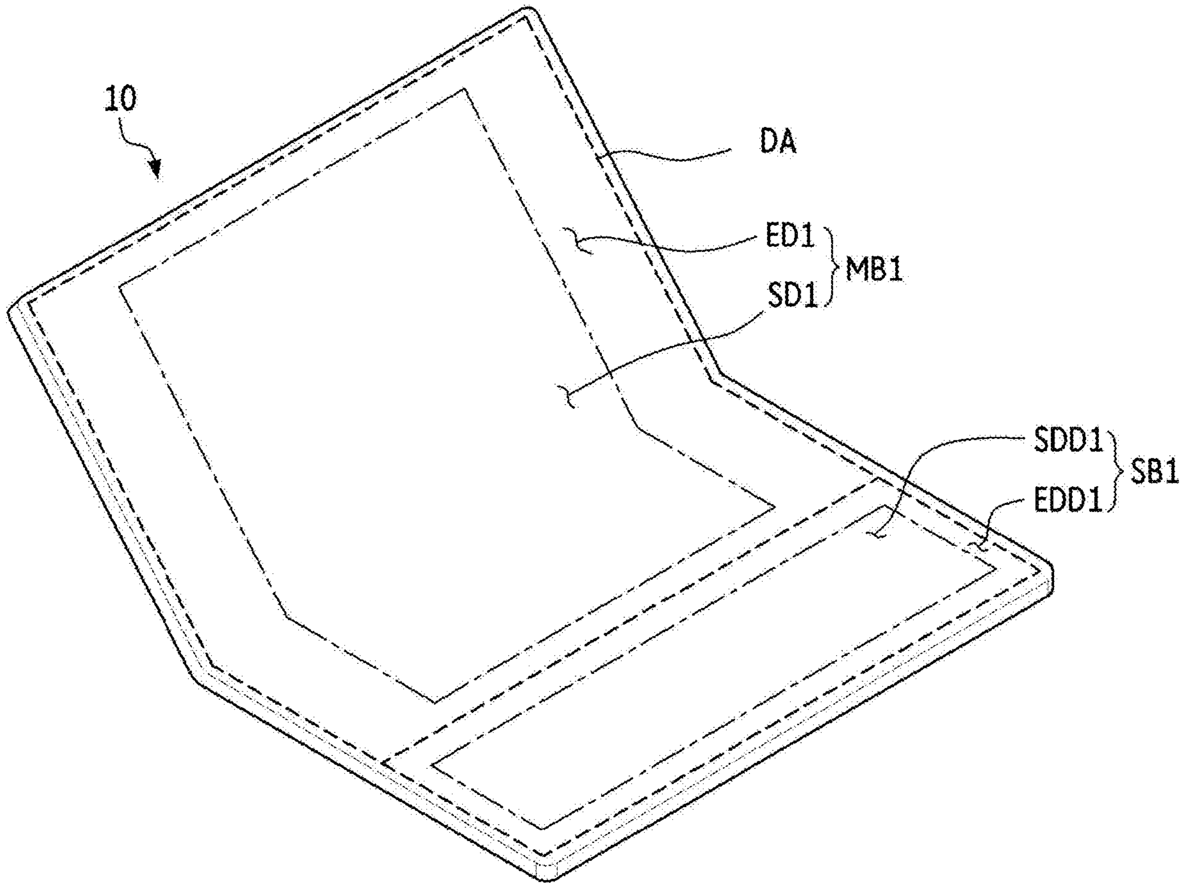
FIG. 10 is a perspective view of second one or more embodiments illustrating a plurality of display areas divided in the image display area of FIGS. 3 and 4.

FIG. 10 is a perspective view of second one or more embodiments illustrating a plurality of display areas divided in the image display area of FIGS. 3 and 4. In addition, FIG. 11 is a perspective view of third one or more embodiments illustrating a plurality of display areas divided in the image display area of FIGS. 3 and 4.

Figure 11:
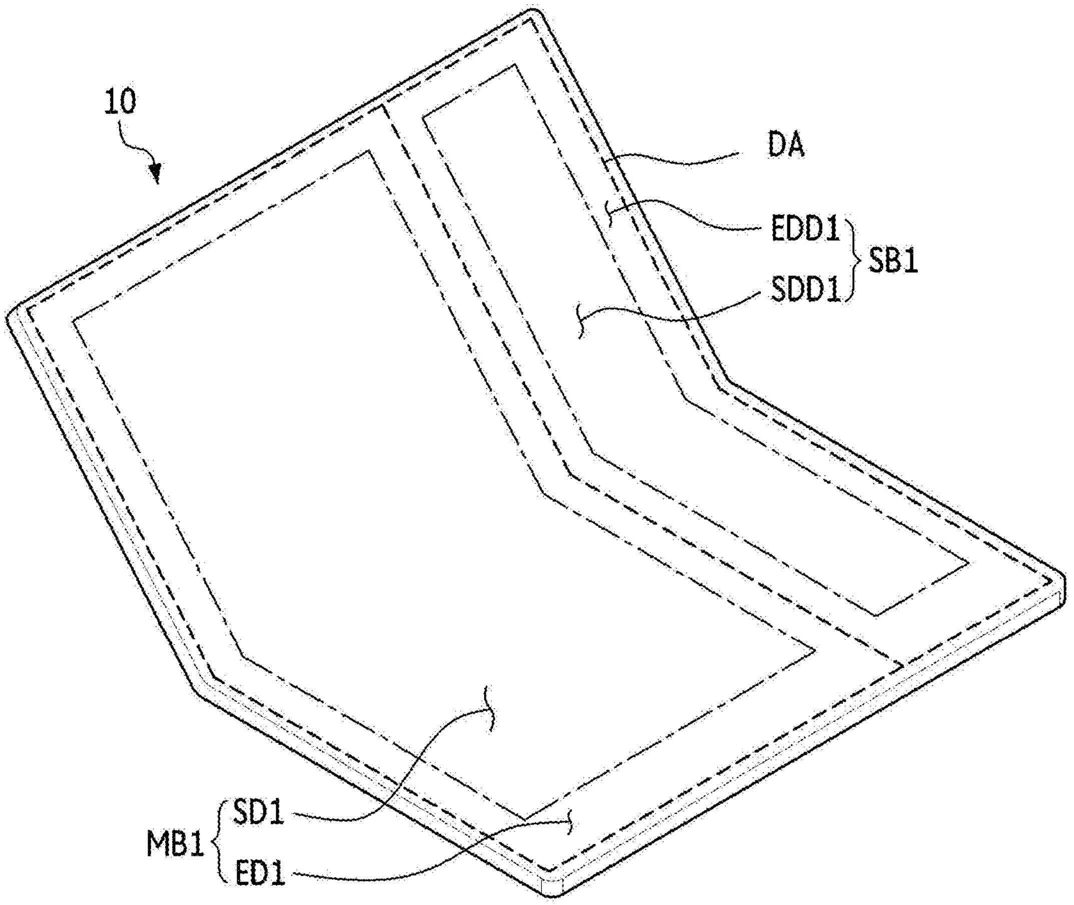
FIG. 11 is a perspective view of third one or more embodiments illustrating a plurality of display areas divided in the image display area of FIGS. 3 and 4.

Referring to FIGS. 10 and 11, the data sorter 211 of the display-driving circuit 200 may analyze brightness characteristics of each part of a displayed image displayed in the image display area DA by comparing grayscale values for each pixel of image data RGB sorted in units of at least one frame with at least one reference grayscale value.

The data sorter 211 may divide the image display area DA into first to k-th display areas MB1 and SB1 so as to correspond to the brightness characteristics of each part of the displayed image displayed in the image display area DA using at least one reference grayscale value. In addition, the data sorter 211 may divide the first display area MB1 into a first central area SD1 and a first peripheral area ED1, and may divide the k-th display area SB1 into a second central area SDD1 and a second peripheral area EDD1. Accordingly, each of the central areas SD1 and SDD1 for each of the first to k-th display areas MB1 and SB1 may be divided in any one polygonal shape, such as a square shape, a rectangular shape, or an equilateral triangular shape in plan view or divided in a circular shape or an elliptical shape in plan view.

As described above, the first central area SD1 may be set to include the number of pixels SP at any one of about 60% to about 90% of the total number of pixels SP included in the first display area MB1, including the central portion (or the center point) of the first display area MB1. In addition, the first peripheral area ED1 may be set to include the number of pixels SP at any one of about 10% to about 40% of the total number of pixels SP included in the first display area MB1 by entirely surrounding the upper, lower, left, and right peripheries of the first display area MB1.

Meanwhile, the data sorter 211 may compare image data sorted in units of at least one frame with image data for each of a plurality of previous frames, may divide a moving image display area and a still image display area according to the number of times of grayscale value change in units of at least one frame, and may divide the image display area DA into the first to k-th display areas MB1 and SB1 according to a division result of a moving image and still image.

Figure 12:
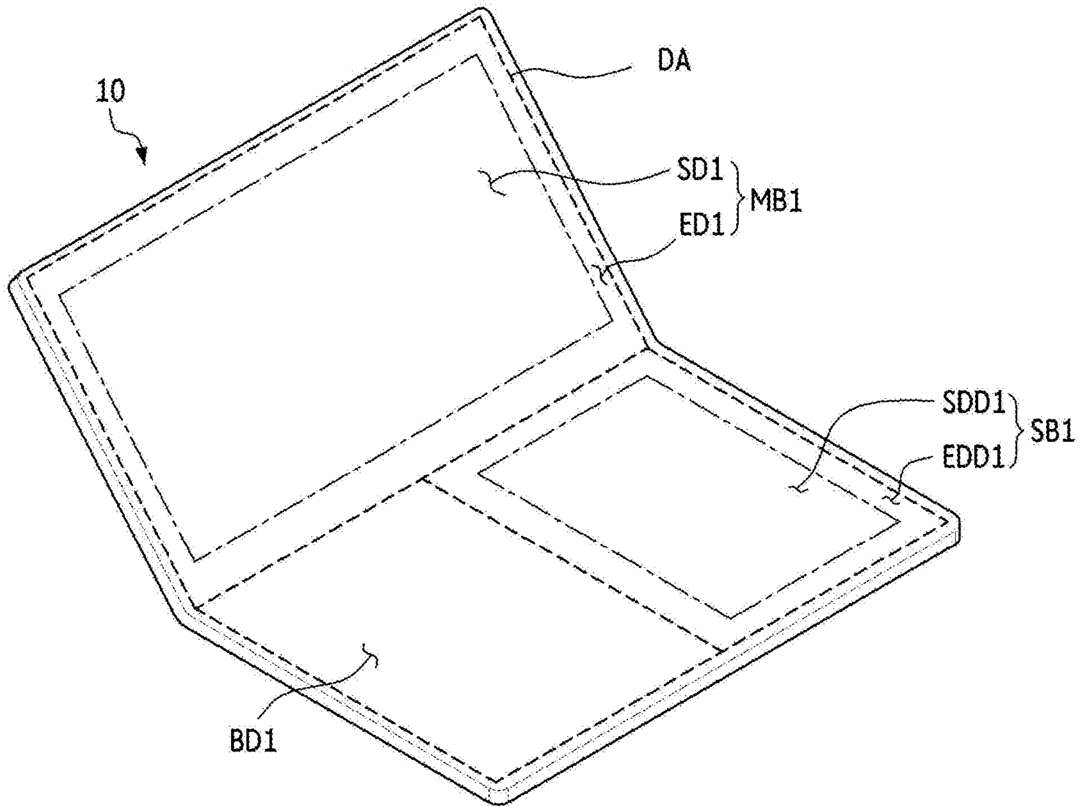
FIG. 12 is a perspective view of fourth one or more embodiments illustrating a plurality of display areas divided in the image display area of FIGS. 3 and 4.

FIG. 12 is a perspective view of fourth one or more embodiments illustrating a plurality of display areas divided in the image display area of FIGS. 3 and 4.

Referring to FIG. 12, the data sorter 211 of the display-driving circuit 200 may analyze brightness characteristics of each part of a displayed image displayed in the image display area DA by comparing grayscale values for each pixel of image data RGB sorted in units of at least one frame with at least one reference grayscale value.

The data sorter 211 may divide the image display area DA into first to k-th display areas MB1 and SB1 and at least one image non-modulated area BD1 so as to correspond to the brightness characteristics of each part of the displayed image displayed in the image display area DA using first and second reference grayscale values.

The data sorter 211 may divide an area where pixels, which have grayscale values that are greater than the first reference grayscale value among grayscale values for each pixel of the image data sorted in units of at least one frame, are located as the first display area MB1. In addition, the data sorter 211 may divide an area where pixels having grayscale values that are less than the second reference grayscale value among the grayscale values for each pixel of the image data are located as the k-th display area SB1. In addition, the data sorter 211 may divide an area where pixels having grayscale values included in the first and second reference grayscale values among the grayscale values for each pixel of the image data are located as the image non-modulated area BD1.

The display-driving circuit 200 modulates grayscale values or luminance values of the image data in units of at least one frame so as to respectively correspond to the first central area SD1 and the first peripheral area ED1 of the first display area MB1 and the second central area SDD1 and the second peripheral area EDD1 of the k-th display area SB1. In addition, the display-driving circuit 200 converts image data for each pixel modulated to correspond to the first central area SD1 and the first peripheral area ED1 of the first display area MB1 and the second central area SDD1 and the second peripheral area EDD1 of the k-th display area SB1 into analog data voltages. The display-driving circuit 200 supplies the respective converted analog data voltages to data lines to which the respective pixels are connected in units of at least one horizontal line.

Figure 13:
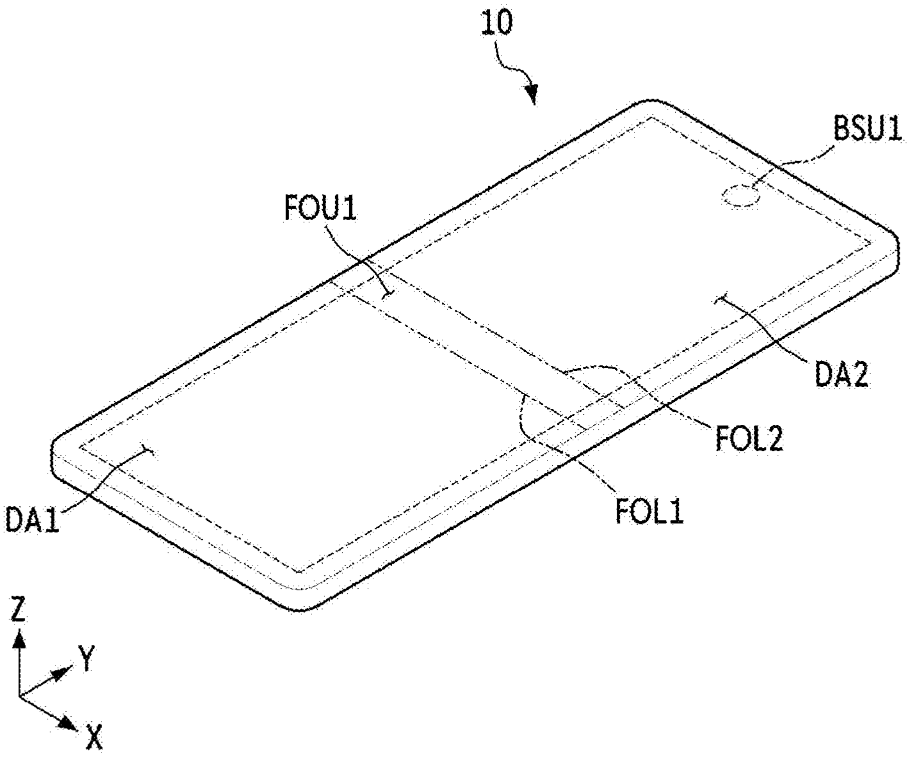
FIGS. 13 and 14 are perspective views illustrating a portable display device according to one or more other embodiments of the present disclosure.
Figure 14:
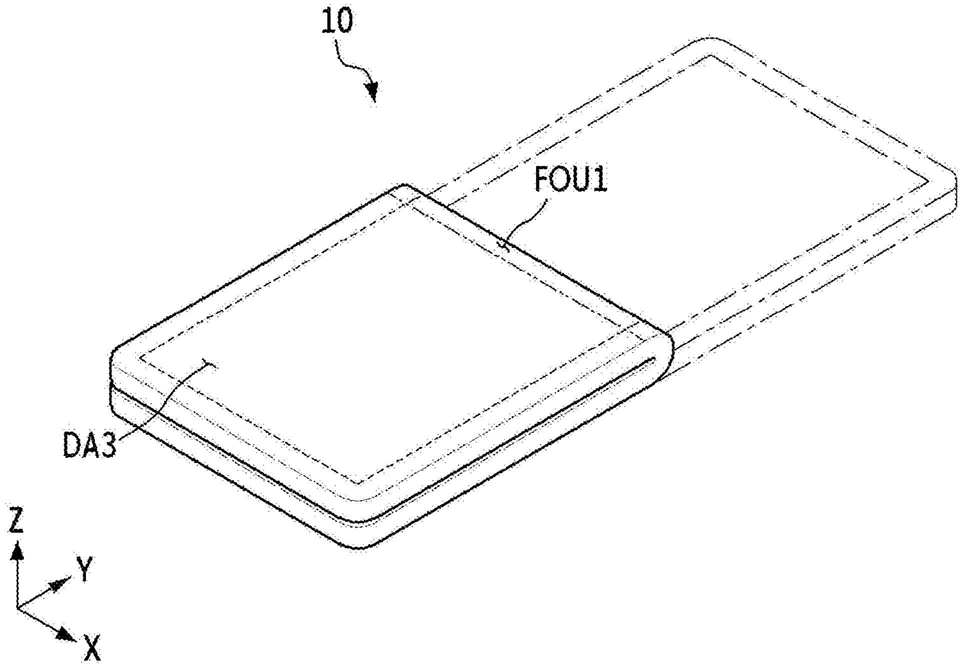

FIGS. 13 and 14 are perspective views illustrating a portable display device according to one or more other embodiments of the present disclosure.

It has been illustrated in FIGS. 13 and 14 that a display device 10 is a foldable display device folded in the second direction (Y-axis direction). The display device 10 may be maintained in both a folded state and an unfolded state. The display device 10 may be folded in an in-folding manner in which a front surface thereof is located inside. When the display device 10 is bent or folded in the in-folding manner, front surfaces of the display device 10 may be located to face each other. Alternatively, the display device 10 may be folded in an out-folding manner in which a front surface thereof is located outside. When the display device 10 is bent or folded in the out-folding manner, rear surfaces of the display device 10 may be located to face each other.

The display device 10 may include a folding area FOU1, a first non-folding area DA1, and a second non-folding area DA2. The folding area FOU1 may be an area where the display device 10 is folded, and the first non-folding area DA1 and the second non-folding area DA2 may be areas where the display device 10 is not folded. The first non-folding area DA1 may be located on one side, for example, the lower side, of the folding area FOU1. The second non-folding area DA2 may be located on the other side, for example, the upper side, of the folding area FOU1.

Touch sensors for sensing a user's touch may be formed and located on the first non-folding area DA1 and the second non-folding area DA2, respectively.

On the other hand, the folding area FOU1 may be an area bent with a curvature (e.g., predetermined curvature) in a first folding line FOL1 and a second folding line FOL2. Therefore, the first folding line FOL1 may be a boundary between the folding area FOU1 and the first non-folding area DA1, and the second folding line FOL2 may be a boundary between the folding area FOU1 and the second non-folding area DA2.

The first folding line FOL1 and the second folding line FOL2 may extend in the first direction (X-axis direction) as illustrated in FIGS. 13 and 14, and the display device 10 may be folded in the second direction (Y-axis direction). For this reason, a length of the display device 10 in the second direction (Y-axis direction) may be reduced by approximately half, and thus, a user may conveniently carry the display device 10.

Meanwhile, an extension direction of the first folding line FOL1 and an extension direction of the second folding line FOL2 are not limited to the first direction (X-axis direction). For example, the first folding line FOL1 and the second folding line FOL2 may extend in the second direction (Y-axis direction), and the display device 10 may be folded in the first direction (X-axis direction). In this case, a length of the display device 10 in the first direction (X-axis direction) may be reduced by approximately half. Alternatively, the first folding line FOL1 and the second folding line FOL2 may extend in a diagonal direction of the display device 10 corresponding to a direction between the first direction (X-axis direction) and the second direction (Y-axis direction). In this case, the display device 10 may be folded in a triangular shape.

When the first folding line FOL1 and the second folding line FOL2 extend in the first direction (X-axis direction) as illustrated in FIGS. 13 and 14, a length of the folding area FOU1 in the second direction (Y-axis direction) may be less than a length of the folding area FOU1 in the first direction (X-axis direction). In addition, a length of the first non-folding area DA1 in the second direction (Y-axis direction) may be greater than the length of the folding area FOU1 in the second direction (Y-axis direction). A length of the second non-folding area DA2 in the second direction (Y-axis direction) may be greater than the length of the folding area FOU1 in the second direction (Y-axis direction).

An image display area DA may be located on a front surface of the display device 10. The image display area DA may overlap the folding area FOU1, the first non-folding area DA1, and the second non-folding area DA2. Therefore, when the display device 10 is unfolded, an image may be displayed in a front surface direction in the folding area FOU1, the first non-folding area DA1, and the second non-folding area DA2 of the display device 10.

It has been illustrated in FIGS. 13 and 14 that a through hole TH, in which a camera or the like is located, is located in the second non-folding area DA2, but the present disclosure is not limited thereto. The through hole TH may be located in the first non-folding area DA1 or the folding area FOU1.

Figure 15:
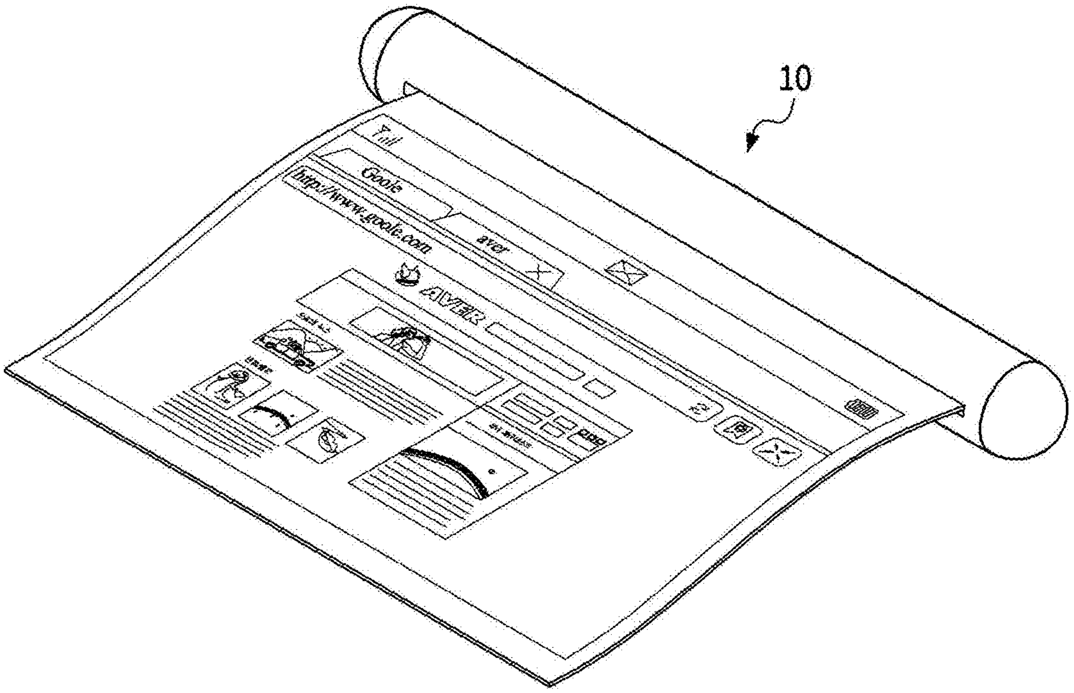
FIG. 15 is a perspective view illustrating a rollable portable display device according to one or more other embodiments of the present disclosure.

FIG. 15 is a perspective view illustrating a rollable portable display device according to one or more other embodiments of the present disclosure. In addition, FIG. 16 is a perspective view illustrating a rollable portable display device according to still one or more other embodiments of the present disclosure.

Figure 16:
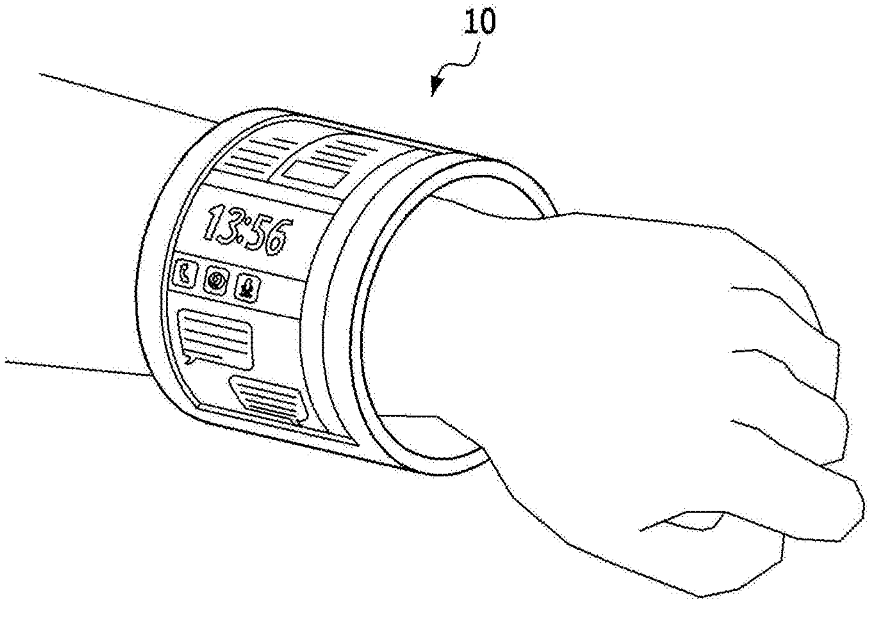
FIG. 16 is a perspective view illustrating a rollable portable display device according to still one or more other embodiments of the present disclosure.

Referring to FIGS. 15 and 16, a rollable portable display device 10 may be applied as a display of portable electronic devices, such as tablet PCs, mobile communication terminals, electronic notebooks, electronic books, and UMPCs. A display panel 100 of the rollable portable display device 10 may be rolled while being bent in the first direction (X-axis direction) or the second direction (Y-axis direction).

With the portable display device according to the embodiments as described above, it is possible to increase power consumption reduction efficiency by reducing power consumption for each image display area DA according to the brightness characteristics or the moving image characteristics and the still image characteristics of the displayed image in an image display period in which a relatively large amount of power is consumed.

In concluding the detailed description, those skilled in the art will appreciate that many variations and modifications can be made to the embodiments without substantially departing from the aspects of the present disclosure. Therefore, the disclosed embodiments of the disclosure are used in a generic and descriptive sense only and not for purposes of limitation.

What is claimed is:

1. A portable display device comprising:

a display panel comprising an image display area having flat display areas and at least one folding area;

a touch sensor on a front surface of the display panel for sensing a user's touch;

a touch-driving circuit for detecting a touch position and a touch movement position for a touch-sensing area of the touch sensor, and for generating at least one touch coordinate data; and a display-driving circuit for analyzing image data to confirm characteristics comprising brightness characteristics, moving image characteristics, or still image characteristics of a displayed image, for dividing the image display area into first to k-th display areas, k being a natural number greater than or equal to 2, according to the confirmed characteristics of the displayed image, for dividing the first display area into a first central area comprising a central portion of the first display area, and a first peripheral area comprising a periphery of the first central area, for dividing the k-th display area into a second central area comprising a central portion of the k-th display area, and a second peripheral area comprising a periphery of the second central area, and for controlling an image display operation of the image display area by modulating luminance values of image data displayed in at least one of the first to k-th display areas.

2. The portable display device of claim 1, wherein the display-driving circuit is configured to divide an area where pixels, which have grayscale values that are greater than a first reference grayscale value of image data sorted in units of at least one frame, are located as the first display area, and to divide an area where pixels, which have grayscale values that are less than the first reference grayscale value of the image data sorted in units of the at least one frame, are located as the k-th display area.

3. The portable display device of claim 1, wherein the display-driving circuit is configured to divide an area where pixels, which have grayscale values that are greater than a first reference grayscale value of image data sorted in units of at least one frame, are located as the first display area, to divide an area where pixels, which have grayscale values that are less than a second reference grayscale value of the image data sorted in units of the at least one frame, are located as the k-th display area, and to divide an area where pixels, which have the first reference grayscale value or the second reference grayscale value of the image data sorted in units of the at least one frame, are located as an image non-modulated area.

4. The portable display device of claim 1, wherein the display-driving circuit is configured to compare image data sorted in units of at least one frame with image data for previous frames to divide an area where pixels, which have grayscale values changing in units of frames, are located as a moving image display area as the first display area, and to compare the image data sorted in units of the at least one frame with the image data for the previous frames to divide an area where pixels, which have grayscale values identically maintained in units of the frames, are located as a still image display area as the k-th display area.

5. The portable display device of claim 1, wherein the first central area comprises about 60% to about 90% of pixels in the first display area, and wherein the first peripheral area comprises about 10% to about 40% of the pixels in the first display area.

6. The portable display device of claim 5, wherein the second central area comprises about 60% to about 90% of pixels in the k-th display area, and wherein the second peripheral area comprises about 10% to about 40% of the pixels in the k-th display area.

7. The portable display device of claim 1, wherein the display-driving circuit is configured to modulate grayscale values or luminance values of image data sorted in units of at least one frame to respectively correspond to the first central area, the first peripheral area, the second central area, and the second peripheral area, to convert image data into analog data voltages, and to supply the analog data voltages to data lines to which pixels are connected.

8. The portable display device of claim 1, wherein the display-driving circuit comprises:

a data sorter for analyzing characteristics comprising the brightness characteristics, the moving image characteristics, or the still image characteristics of the displayed image, and for dividing the image display area into the first to k-th display areas;

a data modulator for receiving image data sorted from the data sorter, and pixel coordinate information on the first to k-th display areas divided in units of at least one frame, and for generating modulated image data in units of the at least one frame by modulating or maintaining luminance values of image data for each pixel respectively corresponding to the first to k-th display areas according to a percentage according to a modulation luminance range; and a digital-to-analog (DA) modulation output for converting image data for each pixel of the modulated image data into data voltages, and for supplying the data voltages into data lines to which respective ones of pixels are connected.

9. The portable display device of claim 8, wherein the data sorter is configured to divide the first display area into the first central area and the first peripheral area, to divide the k-th display area into the second central area and the second peripheral area, and to generate the pixel coordinate information on the first central area, the first peripheral area, the second central area, and the second peripheral area.

10. The portable display device of claim 8, wherein the data modulator is configured to generate modulated image data for each pixel corresponding to the first central area by maintaining luminance values of image data for each pixel corresponding to the first central area according to a percentage according to a first modulation luminance range, and wherein a maximum luminance value is maintained at about 100% compared to a minimum luminance value in the first modulation luminance range.

11. The portable display device of claim 10, wherein the data modulator is configured to generate modulated image data for each pixel corresponding to the first peripheral area by modulating luminance values of image data for each pixel corresponding to the first peripheral area according to a percentage according to a second modulation luminance range, and wherein a maximum luminance value in the second modulation luminance range is about 99% to about 90% of the maximum luminance value of the first modulation luminance range.

12. The portable display device of claim 11, wherein the data modulator is configured to generate modulated image data for each pixel corresponding to the second central area by modulating luminance values of image data for each pixel corresponding to the second central area according to a percentage according to a third modulation luminance range, and wherein a maximum luminance value in the third modulation luminance range is about 89% to about 80% of the maximum luminance value of the first modulation luminance range, or wherein the third modulation luminance range is substantially equal to the second modulation luminance range.

13. The portable display device of claim 12, wherein the data modulator is configured to generate modulated image data for each pixel corresponding to the second peripheral area by modulating luminance values of image data for each pixel corresponding to the second peripheral area according to a percentage according to a fourth modulation luminance range, and wherein a maximum luminance value in the fourth modulation luminance range is about 79% to about 70% of the maximum luminance value of the first modulation luminance range.

14. A portable display device comprising:

a display panel comprising an image display area divided into flat display areas and at least one folding area;

a touch sensor on a front surface of the display panel for sensing a user's touch;

a touch-driving circuit for detecting a touch position and a touch movement position for a touch-sensing area of the touch sensor, and for generating at least one touch coordinate data; and a display-driving circuit for analyzing image data to confirm characteristics comprising brightness characteristics, moving image characteristics, or still image characteristics of a displayed image, for dividing the image display area into first to k-th display areas, k being a natural number greater than or equal to 2, according to the confirmed characteristics, for dividing the first display area into a first central area and a first peripheral area comprising a periphery of the first central area, for dividing the k-th display area into a second central area and a second peripheral area comprising a periphery of the second central area, and for controlling image display operations of the first to k-th display areas by modulating luminance values of image data respectively displayed in the first central area, the first peripheral area, the second central area, and the second peripheral area.

15. The portable display device of claim 14, wherein the first central area comprises about 60% to about 90% of pixels in the first display area, and wherein the first peripheral area comprises about 10% to about 40% of the pixels in the first display area.

16. The portable display device of claim 15, wherein the second central area comprises about 60% to about 90% of pixels in the k-th display area, and wherein the second peripheral area comprises about 10% to about 40% of the pixels in the k-th display area.

17. The portable display device of claim 14, wherein the display-driving circuit comprises:

a data sorter for analyzing characteristics comprising the brightness characteristics, the moving image characteristics, or the still image characteristics of the displayed image, and for dividing the image display area into the first to k-th display areas;

a data modulator for receiving image data sorted from the data sorter and pixel coordinate information on the first to k-th display areas divided in units of at least one frame, and for generating modulated image data in units of the at least one frame by modulating or maintaining luminance values of image data for each pixel respectively corresponding to the first to k-th display areas according to a percentage according to a modulation luminance range; and a digital-to-analog (DA) modulation output for converting image data for each pixel of the modulated image data into data voltages, and for supplying the data voltages into data lines to which respective pixels are connected.

18. The portable display device of claim 17, wherein the data sorter is configured to divide the first display area into the first central area and the first peripheral area, to divide the k-th display area into the second central area and the second peripheral area, and to generate the pixel coordinate information on the first central area, the first peripheral area, the second central area, and the second peripheral area.

19. The portable display device of claim 18, wherein the data modulator is configured to generate modulated image data for each pixel corresponding to the first central area by maintaining luminance values of image data for each pixel corresponding to the first central area according to a percentage according to a first modulation luminance range, and wherein a maximum luminance value is maintained at about 100% compared to a minimum luminance value in the first modulation luminance range.

20. An electronic device including a display device, wherein the display device comprising:

a display panel comprising an image display area having flat display areas and at least one folding area;

a touch sensor on a front surface of the display panel for sensing a user's touch;

a touch-driving circuit for detecting a touch position and a touch movement position for a touch-sensing area of the touch sensor, and for generating at least one touch coordinate data; and a display-driving circuit for analyzing image data to confirm characteristics comprising brightness characteristics, moving image characteristics, or still image characteristics of a displayed image, for dividing the image display area into first to k-th display areas, k being a natural number greater than or equal to 2, according to the confirmed characteristics of the displayed image, for dividing the first display area into a first central area comprising a central portion of the first display area, and a first peripheral area comprising a periphery of the first central area, for dividing the k-th display area into a second central area comprising a central portion of the k-th display area, and a second peripheral area comprising a periphery of the second central area, and for controlling an image display operation of the image display area by modulating luminance values of image data displayed in at least one of the first to k-th display areas.

* * * * *